United States Patent
Komatsu et al.

(10) Patent No.: US 10,679,646 B2
(45) Date of Patent: Jun. 9, 2020

(54) SIGNAL PROCESSING DEVICE, SIGNAL PROCESSING METHOD, AND COMPUTER-READABLE RECORDING MEDIUM

(71) Applicant: NEC Corporation, Minato-ku, Tokyo (JP)

(72) Inventors: Tatsuya Komatsu, Tokyo (JP); Reishi Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/309,512

(22) PCT Filed: Jun. 13, 2017

(86) PCT No.: PCT/JP2017/021775
§ 371 (c)(1),
(2) Date: Dec. 13, 2018

(87) PCT Pub. No.: WO2017/217396
PCT Pub. Date: Dec. 21, 2017

(65) Prior Publication Data
US 2019/0251988 A1 Aug. 15, 2019

(30) Foreign Application Priority Data
Jun. 16, 2016 (JP) ................. 2016-120127

(51) Int. Cl.
*G10L 21/0272* (2013.01)
*G10L 25/51* (2013.01)
(Continued)

(52) U.S. Cl.
CPC .............. *G10L 25/51* (2013.01); *G10L 15/10* (2013.01); *G10L 21/0272* (2013.01); *G10L 21/0308* (2013.01)

(58) Field of Classification Search
CPC ....... G10L 21/028; G10L 17/02; G10L 25/18; G10L 2025/783; G10L 21/0272; G10L 25/21; G10L 21/0216; G10L 21/0208
(Continued)

(56) References Cited

U.S. PATENT DOCUMENTS

| | | | |
|---|---|---|---|
| 2012/0203719 A1 | 8/2012 | Mitsufuji et al. | |
| 2013/0010968 A1* | 1/2013 | Yagi ...................... | G10L 21/028 381/17 |

(Continued)

FOREIGN PATENT DOCUMENTS

| | | | |
|---|---|---|---|
| JP | 2012-163918 A | 8/2012 | |
| JP | 2013-142870 A | 7/2013 | |

(Continued)

OTHER PUBLICATIONS

Courtenay V. Cotton et al., "Spectral vs. Spectro-Temporal Features for Acoustic Event Detection", 2011 IEEE Workshop on Applications of Signal Processing to Audio and Acoustics, Oct. 16-19, 2011, pp. 69-72, 4 pages total.

(Continued)

*Primary Examiner* — Disler Paul

(57) ABSTRACT

A signal processing device includes a prior distribution storage that stores a prior distribution group that is a set of prior distributions representing representative spectral shapes of spectral bases of an acoustic event specified as a detection target, and a basis generation unit that, using as input a spectrogram for basis generation, generates an acoustic event basis group that is a set of the spectral bases of the acoustic event specified as a detection target. The basis generation unit performs sound source separation on the spectrogram for basis generation and thereby generates an acoustic event basis group, using respective prior distributions included in a prior distribution group as a constraint for spectral bases of a corresponding acoustic event.

7 Claims, 13 Drawing Sheets

(51) Int. Cl.
*G10L 21/0308* (2013.01)
*G10L 15/10* (2006.01)

(58) Field of Classification Search
USPC ........... 381/66.83, 93, 94.1–94.7, 56, 66, 83
See application file for complete search history.

(56) References Cited

U.S. PATENT DOCUMENTS

| | | | |
|---|---|---|---|
| 2013/0294608 A1* | 11/2013 | Yoo | G10L 21/0272 381/56 |
| 2016/0071526 A1* | 3/2016 | Wingate | G10L 21/028 704/233 |

FOREIGN PATENT DOCUMENTS

| | | |
|---|---|---|
| JP | 2014-164126 A | 9/2014 |
| JP | 2016-45221 A | 4/2016 |
| WO | 2014/079484 A1 | 5/2014 |

OTHER PUBLICATIONS

Tatsuya Komatsu, et al., "Acoustic Event Detection Based on Non-Negative Matrix Factorization With Mixtures of Local Dictionaries and Activation Aggregation", Proc. ICASSP 2016, IEEE, Mar. 2016, pp. 2259-2263, 5 pages total.
International Search Report dated Aug. 29, 2017 issued by the International Searching Authority in PCT/JP2017/021775.
Written Opinion dated Aug. 29, 2017 issued by the International Searching Authority in PCT/JP2017/021775.

* cited by examiner

SIGNAL PROCESSING DEVICE, SIGNAL PROCESSING METHOD, AND COMPUTER-READABLE RECORDING MEDIUM

This application is a National Stage Entry of PCT/JP2017/021775 filed on Jun. 13, 2017, which claims priority from Japanese Patent Application 2016-120127 filed on Jun. 16, 2016, the contents of all of which are incorporated herein by reference, in their entirety.

TECHNICAL FIELD

The present disclosure relates to a signal processing device, a signal processing method, and a computer-readable recording medium that process acoustic signals.

BACKGROUND ART

There exists a technology for detecting a predetermined acoustic event from an acoustic signal and separating an acoustic signal into signals from different sound sources. An acoustic event is detected as a pattern of an acoustic signal corresponding to a physical event. The acoustic event is associated with a physical state that the physical event induces and an acoustic signal pattern in a period corresponding to the physical state. For example, in case that an acoustic event of "glass crushing" is defined as a detection target, the acoustic event is associated with an acoustic signal pattern that is generated when glass is broken and a physical state "glass being broken".

For example, NPL 1 describes a method of calculating activation levels of a basis matrix of an acoustic event from a spectrogram of an acoustic signal, using NMF (Nonnegative Matrix Factorization) and detecting an acoustic event included in the acoustic signal, using the activation levels as a feature. More specifically, the method described in NPL 1, by performing, on a spectrogram of an acoustic signal, NMF that uses, as a teacher basis, a basis matrix calculated from learning data in advance, calculates activation levels of respective spectral bases included in the basis matrix. The method, by identifying whether or not a specific acoustic event is included in the acoustic signal, based on a combination of the calculated activation levels, detects an acoustic event.

NMF is also often used for sound source separation for an acoustic signal including sounds from a plurality of sound sources. For example, using NMF, a spectrum of an acoustic signal specified as a separation target is factorized into a basis matrix representing spectral bases of respective sound sources and an activation matrix representing activation levels of the spectral bases. The factorization results in a spectrum for each sound source. The method described in NPL 1 assumes that an acoustic signal generated by a predetermined sound source may also be specified as a detection target acoustic event. That is, the method assumes that, in acoustic events, an acoustic signal pattern corresponding to a physical event that is a generation of a sound from a predetermined sound source is also included.

CITATION LIST

Non Patent Literature

[NPL 1] Courtenay V. Cotton and Daniel P. W. Ellis, 'SPECTRAL VS. SPECTRO-TEMPORAL FEATURES FOR ACOUSTIC EVENT DETECTION', 2011 IEEE Workshop on Applications of Signal Processing to Audio and Acoustics.

SUMMARY OF INVENTION

Technical Problem

However, the method described in NPL 1 has a problem in that identification accuracy of an acoustic event is not sufficient. For example, there has been a problem in that, when, under an unknown environment and the like, an unknown sound that may not be expressed by a basis matrix generated from learning data is present, the method described in NPL 1 is likely to falsely identify the unknown sound, which is essentially not a detection target, as a detection target acoustic event. In addition, in the method described in NPL 1, for example, there exist many local solutions in the solutions of NMF for generating a basis matrix. Thus, the method described in NPL 1 has a problem of being incapable of estimating a basis matrix from learning data with high accuracy and being likely to fail in extracting an accurate basis matrix. When an accurate basis matrix is not extracted, it is difficult to detect an acoustic event accurately. Note that, in the case of sound source separation, as with the above-described case, a problem of local solution also arises when a basis matrix representing spectral bases of a sound source specified as a detection target is to be obtained using NMF.

Accordingly, an object of the present disclosure is to provide a signal processing device, a signal processing method, and a computer-readable recording medium that are capable of improving identification accuracy of an acoustic event.

Solution to Problem

A signal processing device according to the present disclosure includes a prior distribution storage that stores a prior distribution group that is a set of prior distributions representing representative spectral shapes of spectral bases of an acoustic event specified as a detection target, and a basis generation unit that generates, using as input a spectrogram for basis generation, an acoustic event basis group that is a set of the spectral bases of the acoustic event specified as a detection target. The basis generation unit performs sound source separation on the spectrogram for basis generation and thereby generates an acoustic event basis group, using respective prior distributions included in a prior distribution group as a constraint for spectral bases of a corresponding acoustic event.

A signal processing method according to the present disclosure includes upon input of a spectrogram for basis generation, using respective prior distributions included in a prior distribution group that is a set of prior distributions representing representative spectral shapes of spectral bases of an acoustic event specified as a detection target as a constraint for the spectral bases of the corresponding acoustic event, performing sound source separation on the spectrogram for basis generation and thereby generating an acoustic event basis group that is a set of the spectral bases of the acoustic event specified as a detection target.

A signal processing method according to the present disclosure includes: using as input a spectrogram of an acoustic signal including only a sound from a specific sound source, generating a prior distribution group that is a set of prior distributions representing representative spectral shapes of spectral bases of the specific sound source; upon input of a spectrogram for basis generation, using respective prior distributions included in the prior distribution group as a constraint for the spectral bases of the corresponding specific sound source, performing sound source separation on the spectrogram for basis generation and thereby generating an acoustic event basis group that is a set of the spectral bases of the specific sound source; upon input of a spectrogram of an acoustic signal for sound source separation, performing sound source separation on the spectrogram by, using a first basis matrix representing the acoustic event basis group and using the respective prior distributions included in the prior distribution group as a constraint for the spectral bases of the corresponding specific sound source, causing the first basis matrix to be learned and calculating the spectral bases of the specific sound source and activation levels of the spectral bases in the spectrogram of the acoustic signal for sound source separation; and based on the calculated spectral bases of the specific sound source and activation levels of the spectral bases in the spectrogram of the acoustic signal for sound source separation, generating a signal including only a sound from the specific sound source from the acoustic signal for sound source separation.

A computer-readable recording medium according to the present disclosure stores a signal processing program for causing a computer to execute processing of, upon input of a spectrogram for basis generation, using respective prior distributions included in a prior distribution group that is a set of prior distributions representing representative spectral shapes of spectral bases of an acoustic event specified as a detection target as a constraint for the spectral bases of the corresponding acoustic event, performing sound source separation on the spectrogram for basis generation and thereby generating an acoustic event basis group that is a set of the spectral bases of the acoustic event specified as a detection target.

A computer-readable recording medium according to the present disclosure stores a signal processing program for causing a computer to execute: processing of, using as input a spectrogram of an acoustic signal including only a sound from a specific sound source, generating a prior distribution group that is a set of prior distributions representing representative spectral shapes of spectral bases of the specific sound source; processing of, upon input of a spectrogram for basis generation, using respective prior distributions included in the prior distribution group as a constraint for the spectral bases of the corresponding specific sound source, performing sound source separation on the spectrogram for basis generation and thereby generating an acoustic event basis group that is a set of the spectral bases of the specific sound source; processing of, upon input of a spectrogram of an acoustic signal for sound source separation, performing sound source separation on the spectrogram by, using a first basis matrix representing the acoustic event basis group and using the respective prior distributions included in the prior distribution group as a constraint for the spectral bases of the corresponding specific sound source, causing the first basis matrix to be learned and calculating spectral bases of the specific sound source and activation levels of the spectral bases in the spectrogram of the acoustic signal for sound source separation; and processing of, based on the calculated spectral bases of the specific sound source and activation levels of the spectral bases in the spectrogram of the acoustic signal for sound source separation, generating a signal including only a sound from the specific sound source from the acoustic signal for sound source separation.

Advantageous Effects of Invention

The present disclosure enables identification accuracy of an acoustic event to be improved.

EXAMPLE EMBODIMENT

Figure 1:
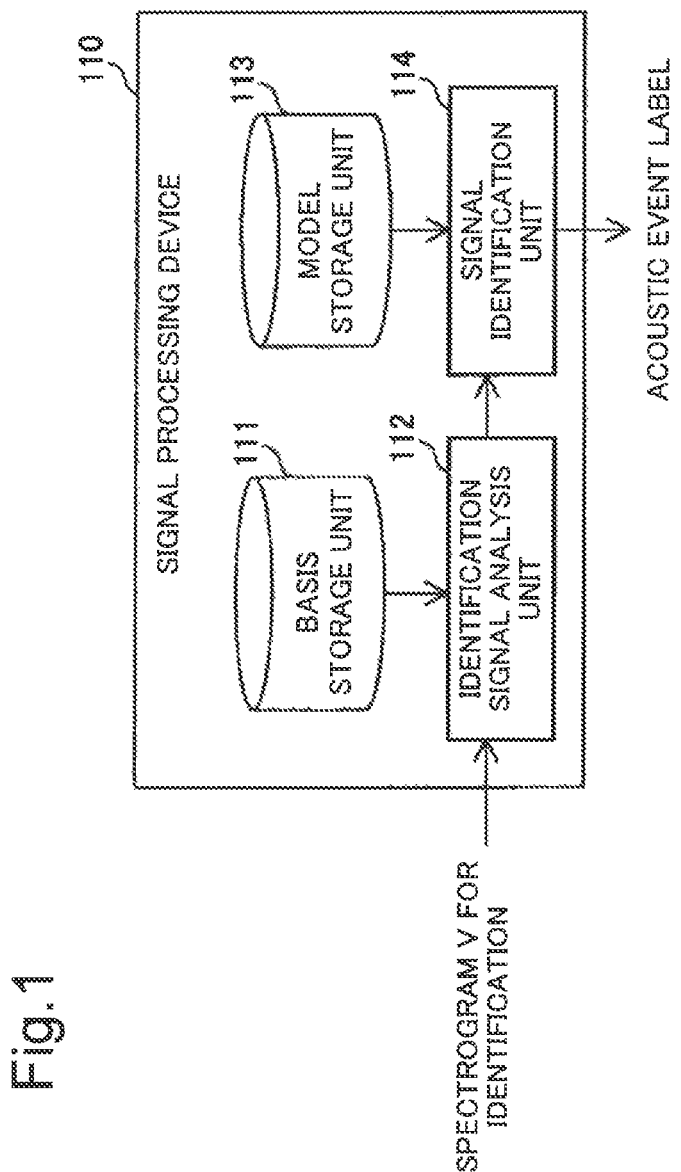
FIG. 1 is a block diagram illustrating a configuration example of a signal processing device 110 of a first example embodiment.

Hereinafter, example embodiments of the present disclosure will be described with referent to the drawings.

First, as a prerequisite technology for the present disclosure, sound source separation operation by means of NMF that serves will be described simply.

NMF is a matrix factorization method that approximates a spectrogram V of an input acoustic signal with the product of a basis matrix W(k, r) with K rows and R columns and an activation matrix H(r, j) with R rows and J columns, as expressed by the equation (1) below.

$$V \approx WH \tag{1}$$

A spectrogram V of an acoustic signal input to NMF may, for example, be a matrix V(k, j) with K rows and J columns the elements of which are pieces of numerical intensity data obtained by performing a short-time Fourier transform on an acoustic time series signal x(t). The acoustic time series signal x(t) may, for example, be a digital signal obtained by A/D converting (analog digital converting) an analog signal, which is recorded by means of a microphone or the like.

As used herein, t denotes an index of time. In addition, K and k denote the number of frequency bins and an index of a frequency bin, respectively. Further, J and j denote the number of time frames when performing short-time Fourier transforms and an index of a time frame when performing a short-time Fourier transform, respectively. Hereinafter, the same applies to other matrix expressions.

In addition, R and r denote the number of bases and an index of a basis, respectively. The spectral basis matrix W(k, r) may be interpreted as a matrix into which R spectral bases, each of which is expressed as a vector representing a spectral shape, are concatenated in the column direction. Similarly, the activation matrix H(r, j) may be interpreted as a matrix into which R activations, each of which represents activation levels corresponding to one of the spectral bases, are concatenated in the row direction. Hereinafter, the same applies to other matrix expressions. Note that the expression method of respective spectral bases and activation levels (activation timings and magnitudes of activation) of the respective spectral bases is not limited to the above example. Hereinafter, W and H are sometimes simply expressed as a basis W and an activation H.

The basis W and the activation H are calculated in such a way as to minimize a required cost function. The following example embodiments will be described using, as an example, a case where generalized Kullback-Leibler (KL) divergence as expressed by the equation (2) below is used for a cost function.

[Math 1]

$$D_{KL}(V, WH) = V \circ \log\left(\frac{V}{WH}\right) + (WH - V) \quad (2)$$

In the above equation, the symbol ∘ denotes the element-wise product of matrices. The fractional expression denotes element-wise division of matrices.

A basis W and an activation H that update the cost function ($D_{KL}$, expressed by the equation (2)) a number of times less than or equal to a predetermined threshold value or a predetermined number of times are, for example, calculated using the equations (3) and (4) below alternately and repeatedly.

[Math 2]

$$H \leftarrow H \circ \left\{W^T\left(\frac{V}{WH}\right)\right\} / W^T O \quad (3)$$

$$W \leftarrow W \circ \left\{\left(\frac{V}{WH}\right)H^T\right\} / OH^T \quad (4)$$

In the above equations, $A^T$ denotes the transpose of a matrix A. The matrix O denotes a matrix that has the same size as the matrix V and the elements of which are all 1. As initial values of the basis W and the activation H, values generated as random numbers are generally used. The two equations described above are updated until the cost function becomes smaller than or equal to a threshold value or the number of repeats reaches a preset number. Note that, in the case of supervised NMF, which is used, for example, when an activation H as a feature used for an identification model is to be obtained from learning data, only the activation H is updated under the assumption that a basis W has already been obtained.

For example, an acoustic event detection method described in NPL 1 performs NMF, as preprocessing, on a spectrogram of a signal that is obtained by joining acoustic signals including acoustic events desired to be detected and thereby generates a spectral basis group (basis W) corresponding to the respective acoustic events. The acoustic event detection method performs supervised NMF using the basis W on a spectrogram of an unknown acoustic signal and thereby calculates activation levels (activation H) of the respective spectral bases. The acoustic event detection method, by identifying whether or not an acoustic event that is a detection target is included in the unknown acoustic signal from a combination of the activation levels of the respective spectral bases, detects an acoustic event.

A basis W that is obtained by factorizing a spectrogram of an acoustic event specified as a detection target by means of NMF may be considered to represent spectra of sounds corresponding to physical elements that constitute the acoustic event. For example, when an acoustic event labeled as "sound of glass being broken" includes an impact sound at the moment when glass is broken and a sound of broken glass fragments flying off, it is considered that factorizing a spectrogram of the acoustic event by means of NMF enables a basis W to be obtained that represents spectra of sounds corresponding to elements that correspond to two physical phenomena, that is, an impact sound at the moment when glass is broken and a sound of broken glass fragments flying off.

Thus, when factorizing a spectrogram of an unknown acoustic signal by means of supervised NMF using a combination of such spectral bases results in a pre-learned pattern for the label "sound of glass being broken", such as a pattern in which activations (activation levels) of the spectral bases corresponding to the two physical phenomena described above take large values at predetermined timings, the acoustic signal is identified to include the acoustic event labeled as "sound of glass being broken".

First Example Embodiment

Next, a first example embodiment of the present disclosure will be described. FIG. 1 is a block diagram illustrating a configuration example of a signal processing device 110 of the first example embodiment. The signal processing device 110 illustrated in FIG. 1 is a device that functions as an acoustic event identification device that, using as input a spectrogram V for identification that is a spectrogram of an acoustic signal specified as a detection target, outputs an acoustic event label that indicates an identification result of an acoustic event included in the spectrogram V. Note that, when no acoustic event is included, an identification result to that effect is output.

As illustrated in FIG. 1, the signal processing device 110 includes a basis storage unit 111, an identification signal analysis unit 112, a model storage unit 113, and a signal identification unit 114.

The basis storage unit 111 stores a spectral basis group (basis $W_e$, which will be described later) that indicates frequency patterns of an acoustic event specified as a detection target.

The model storage unit 113 stores an identification model for identifying an acoustic event, based on an activation (activation $H_e$, which will be described later) that is activation levels of respective spectral bases included in a basis $W_e$. Although details of an identification model are not limited specifically, examples of an identification model include a support vector machine (SVM), a hidden Markov model, a mixture Gaussian model, a neural network, and the like. For example, when an SVM is used as an identification model, a matrix $A_e$ representing an identification plane and an intercept vector $b_e$ are stored in the model storage unit 113.

The identification signal analysis unit 112, using as input a spectrogram V for identification, performs semi-supervised NMF using a basis $W_e$, stored in the basis storage unit 111, as a teacher basis and thereby calculates an activation $H_e$ that represents activation levels by means of weights on the respective spectral bases included in the basis $W_e$.

The semi-supervised NMF that the identification signal analysis unit 112 uses, as spectral bases used for sound source separation, not only spectral bases corresponding to an acoustic event predefined as a detection target but also spectral bases corresponding to an unknown sound source, that is, a sound source other than the predefined acoustic event. More specifically, the semi-supervised NMF uses, in place of a basis matrix W described above, a basis matrix $W_{semi}[W_e \ W_u]$ that is obtained by concatenating a basis matrix $W_u$ corresponding to an unknown acoustic event to a basis matrix $W_e$ corresponding to a predefined acoustic event. In association with the use of the basis matrix $W_{semi}[W_e \ W_u]$, the semi-supervised NMF uses an activation matrix $H_{semi}[H_e \ H_u]$ that is obtained by concatenating an activation matrix $H_u$ corresponding to the basis $W_u$ to an activation matrix $H_e$ corresponding to the basis $W_e$. Hereinafter, $W_e$, $W_u$, $H_e$, and $H_u$ are sometimes referred to as an acoustic event basis, an unknown event basis, an acoustic event activation, and an unknown event activation, respectively.

For example, when it is assumed that $R_e$ and $R_u$ denote the number of bases in $W_e$ and the number of bases in $W_u$, respectively, an acoustic event basis $W_e$, an unknown event basis $W_u$, and a basis $W_{semi}$ are represented by a matrix with K rows and $R_e$ columns, a matrix with K rows and $R_u$ columns, and a matrix with K rows and $(R_e+R_u)$ columns, respectively. Similarly, activations $H_e$, $H_u$, and $H_{semi}$ are represented by a matrix with $R_e$ rows and J columns, a matrix with $R_u$ rows and J columns, and an activation matrix with $(R_e+R_u)$ rows and J columns, respectively.

In the semi-supervised NMF, the identification signal analysis unit 112, by approximating an input spectrogram V for identification with the product of $W_{semi}[W_e \ W_u]$ and $H_{semi}[H_e \ H_u]$, as expressed by the equation (a-1) below, calculates an acoustic event activation $H_e$ in V.

$$V \approx W_{semi} H_{semi} \quad (a\text{-}1)$$

In the semi-supervised NMF, values of $W_u$ and $H_{semi}[H_e \ H_u]$ are optimized according to an input spectrogram V. In other words, the identification signal analysis unit 112 updates the values of $W_u$ and $H_{semi}[H_e H_u]$ in such a way that the values match the input spectrogram V. More specifically, in the semi-supervised NMF, the identification signal analysis unit 112, by alternately updating $H_{semi}$ and $W_u$, as expressed by the equations (a-2) and (a-3) below, calculates optimum $W_u$, $H_e$, and $H_u$. Although there is no specific requirement for initial values of $W_u$, $H_e$, and $H_u$, values generated as random numbers are generally used therefor.

[Math 3]

$$H_{semi} \leftarrow H_{semi} \circ \left\{ W_{semi}^T \left( \frac{V}{W_{semi} H_{semi}} \right) \right\} / W_{semi}^T O \quad (a\text{-}2)$$

$$W_u \leftarrow W_u \circ \left\{ \left( \frac{V}{W_{semi} H_{semi}} \right) H_u^T \right\} / O H_u^T \quad (a\text{-}3)$$

Such update processing causes the unknown event basis $W_u$ to be learned as a basis representing, among the spectral components included in the spectrogram V, spectral components that may not be expressed by the acoustic event basis $W_e$.

Note that an acoustic event basis $W_e$ is only required to be a set of spectral bases that express frequency patterns corresponding to frequency components that correspond to respective predefined acoustic events and an expression method thereof is not limited to the one described above. Note also that an unknown event basis $W_u$ is only required to be a set of spectral bases that express frequency patterns corresponding to frequency components other than frequency components that correspond to a known acoustic event and an expression method thereof is not limited to the one described above. An acoustic event activation $H_e$ is only required to be a matrix expressing activation levels of the respective spectral bases included in $W_e$ in V, and an expression method thereof is not limited to the one described above. Similarly, an unknown event activation $H_u$ is only required to be a matrix expressing activation levels of the respective spectral bases included in $W_u$ in V, and an expression method thereof is not limited to the one described above.

On this occasion, the number $R_u$ of bases in an unknown event basis $W_u$ may be a fixed value or a variable value that is first provided with an initial value and subsequently increases in a process of update processing.

The signal identification unit 114 identifies an acoustic event included in the input spectrogram V, based on the acoustic event activation $H_e$ output from the identification signal analysis unit 112, using an identification model stored in the model storage unit 113.

Figure 2:
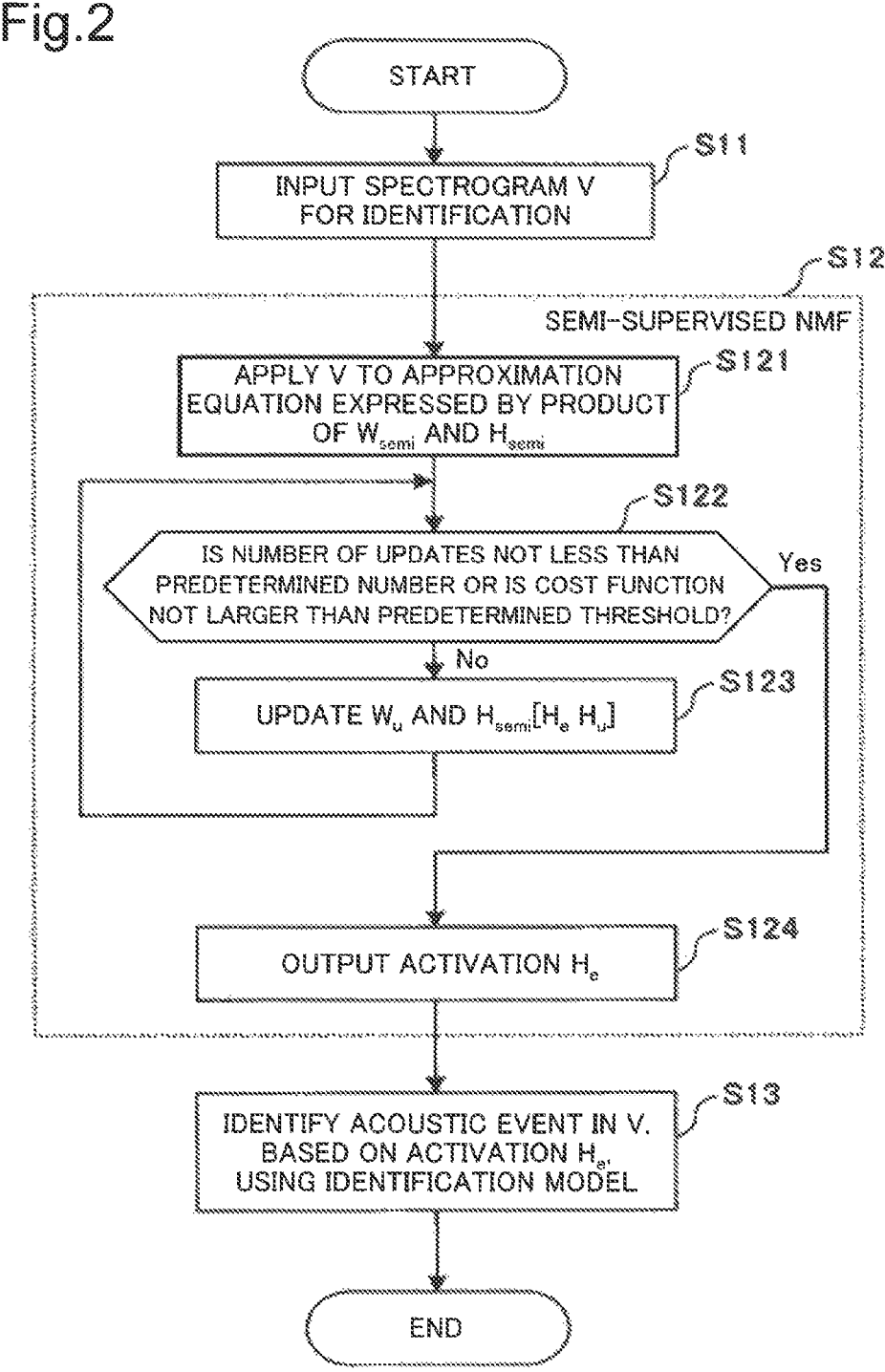
FIG. 2 is a flowchart illustrating an example of operation of the first example embodiment.

Next, operation of the present example embodiment will be described. FIG. 2 is a flowchart illustrating an example of the operation of the present example embodiment. In this example, first, a spectrogram V for identification is input to the signal processing device 110 (step S11).

Upon input of the spectrogram V for identification, the identification signal analysis unit 112 performs, on V, semi-supervised NMF using, as a teacher basis, an acoustic event basis $W_e$ stored in the basis storage unit 111 (step S12).

In step S12, the identification signal analysis unit 112 first applies V to an approximation equation that is expressed by the product of $W_{semi}[W_e \ W_u]$ and $H_{semi}[H_e \ H_u]$ (step S121). Next, the identification signal analysis unit 112 determines whether the number of updates of $W_u$ and $H_{semi}$ is greater than or equal to a predetermined number or whether a cost function is smaller than or equal to a predetermined threshold value (step S122). On one hand, when the number of updates of $W_u$ and $H_{semi}$ is not greater than or equal to the predetermined number and the cost function is not smaller than or equal to the predetermined threshold value (No in step S122), the identification signal analysis unit 112 updates either or both of $W_u$ and $H_{semi}$ (step S123).

On the other hand, when the number of updates of $W_u$ and $H_{semi}$ is greater than or equal to the predetermined number or the cost function is smaller than or equal to the predetermined threshold value (Yes in step S122), the identification signal analysis unit 112 outputs the activation $H_e$ in the approximation equation (step S124).

Upon output of the activation $H_e$ with respect to V, the signal identification unit 114 identifies an acoustic event included in V, based on the activation $H_e$, using an identification model stored in the model storage unit 113 (step S13).

As described above, even for an acoustic signal collected under an environment where an unknown sound is present, the present example embodiment enables an acoustic event included in a spectrogram (spectrogram V for identification) of the acoustic signal to be identified with high accuracy. This is because, by newly introducing, as a basis when factorizing the input spectrogram V into spectral components, $W_{semi}$ that includes an unknown event basis $W_u$ expressing an unknown sound and appropriately updating the basis $W_u$ in semi-supervised NMF, only components corresponding to an acoustic event basis $W_e$ may be calculated accurately. That is, in the present example embodiment, since use of semi-supervised NMF in feature extraction in which spectra corresponding to physical phenomena are extracted from a spectrogram V enables an element that may not be factorized by using only a known basis to be learned on the spot, it is possible to perform feature extraction robust against presence of an unknown sound source.

For example, in the case of supervised NMF using only a basis $W_e$ without introducing a basis $W_u$, V is factorized using only the basis $W_e$. Thus, when an unknown spectrum that is not included in the basis $W_e$ is included in V, an activation $H_e$ in V is liable to have an unexpected value and to be input to an identifier as an erroneous feature. However, in the case of semi-supervised NMF with a basis $W_u$ introduced, V is factorized using a basis $W_{semi}[W_e\ W_u]$. Since this factorization using the basis $W_{semi}[W_e\ W_u]$ enables the basis $W_u$ to accept, among the spectral components included in V, all components that may not be expressed by the basis $W_e$, it is possible to calculate an activation $H_e$ in V with high accuracy. Therefore, input of the activation $H_e$ obtained in this way to the identifier as a feature enables an acoustic event included in V to be identified with high accuracy.

Second Example Embodiment

Figure 3:
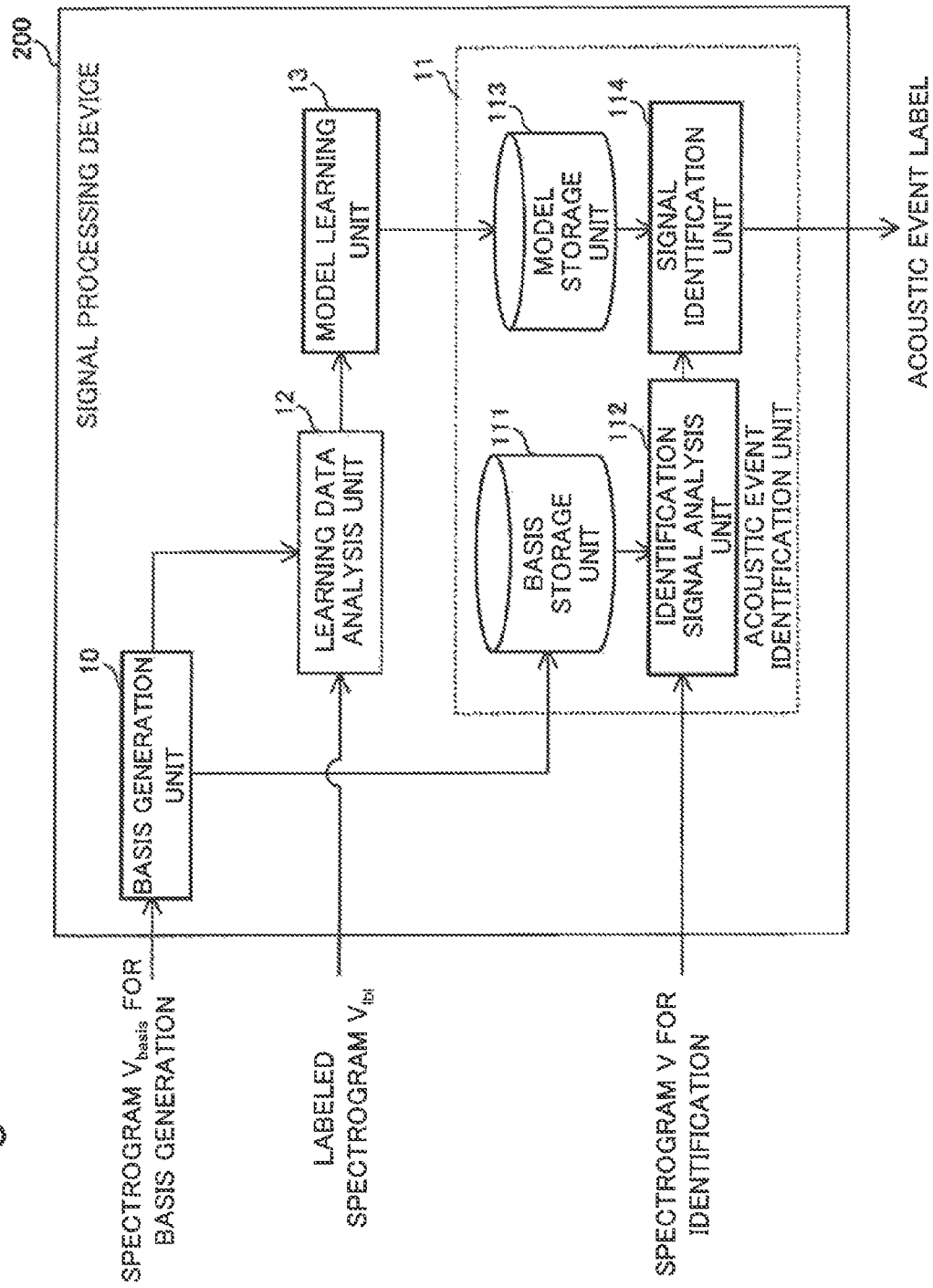
FIG. 3 is a block diagram illustrating a configuration example of a signal processing device 200 of a second example embodiment.

Next, a second example embodiment of the present disclosure will be described. FIG. 3 is a block diagram illustrating a configuration example of a signal processing device 200 of the second example embodiment. The signal processing device 200 illustrated in FIG. 3 further includes a basis generation unit 10, a learning data analysis unit 12, and a model learning unit 13 in addition to the configuration of the signal processing device 110 of the first example embodiment. Note that, in FIG. 3, a case where the signal processing device 200 includes, as respective constituent components of an acoustic event identification unit 11, the respective constituent components (with reference signs 111 to 114) that the signal processing device 110 of the first example embodiment includes is illustrated.

The signal processing device 200 of the present example embodiment detects an acoustic event by inputting a spectrogram $V_{basis}$ for basis generation and generating an acoustic event basis $W_e$, inputting a labeled spectrogram $V_{lbl}$ and learning an identification model, and inputting a spectrogram V for identification and identifying an acoustic event included in the spectrogram V for identification.

The basis generation unit 10, upon input of a spectrogram $V_{basis}$ for basis generation, generates an acoustic event basis $W_e$ and stores the generated acoustic event basis $W_e$ in the basis storage unit 111. There is no specific requirement for a generation method of an acoustic event basis $W_e$. The basis generation unit 10 may, for example, input, as a spectrogram $V_{basis}$ for basis generation, a spectrogram obtained by joining acoustic signals including acoustic events specified as detection targets and, by performing, on the spectrogram $V_{basis}$, NMF using an approximation equation expressed by the equation (b-1) below, obtain an acoustic event basis $W_e$. In the NMF, the basis generation unit 10 optimizes (updates) $W_e$ and $H_e$.

$$V_{basis} \approx W_e H_e \quad \text{(b-1)}$$

The only difference between the NMF and general NMF is that V, W, and H in an approximation equation expressed by the above-described equation (1) used in the general NMF are replaced with $V_{basis}$, $W_e$, and $H_e$, and the same applies to a cost function and update equations.

Note that a spectrogram $V_{basis}$ for basis generation is only required to be a spectrogram that enables spectra corresponding to respective acoustic events included in learning data to be extracted from an actual signal and is not limited to the example described above.

The acoustic event basis $W_e$ generated by the basis generation unit 10 is stored in the basis storage unit 111 and therewith output to the learning data analysis unit 12 at the succeeding stage. Note that the learning data analysis unit 12 may be configured to refer to an acoustic event basis $W_e$ stored in the basis storage unit 111. In that case, the output of the generated acoustic event basis $W_e$ to the learning data analysis unit 12 is omitted.

The learning data analysis unit 12 calculates an acoustic event activation $H_e$ that is associated with an acoustic event label, using as input a labeled spectrogram $V_{lbl}$, based on the acoustic event basis $W_e$ generated by the basis generation unit 10. As used herein, a labeled spectrogram $V_{lbl}$ is learning data that are obtained by assigning, to a spectrogram of an acoustic event, a label (acoustic event label) representing the acoustic event.

A labeled spectrogram $V_{lbl}$ may, for example, be one of spectrograms of all E acoustic events that are detection targets, each of the spectrograms being assigned with a corresponding acoustic event label.

For example, when an acoustic event "scream" and an acoustic event "sound of glass being broken" are specified as detection targets, each of a spectrogram of a scream to which an acoustic event label corresponding to the acoustic event "scream" is assigned and a spectrogram of a sound of glass being broken to which an acoustic event label corresponding to the acoustic event "sound of glass being broken" is assigned is input as a labeled spectrogram $V_{lbl}$. Note that each labeled spectrogram $V_{lbl}$ is only required to be a matrix $V_{lbl}(k, j)$ with K rows and $J_{lbl}$ columns.

The number $J_{lbl}$ of time frames in a labeled spectrogram $V_{lbl}$ is set at a number equivalent to a length that exactly covers an acoustic signal pattern of each acoustic event (for example, in the case of an acoustic event labeled as "sound of glass being broken", assuming that an acoustic signal pattern starts with an impact sound at the moment when glass is broken and ends with a sound of broken glass fragments flying off, a length that exactly covers such sounds).

Note that, since a spectrogram $V_{basis}$ for basis generation, on the other hand, is a spectrogram for generating, as bases, frequency patterns that constitute acoustic events desired to be detected, the spectrogram $V_{basis}$ for basis generation preferably includes frequency patterns of all acoustic events desired to be detected. As an example, a spectrogram $V_{basis}$ for basis generation may be a matrix $V_{basis}(k, j)=[V_{lbl\_1}(k,$ j), $V_{lbl\_2}(k, j), \ldots, V_{lbl\_E}(k, j)$] with K rows and $J_{basis}$ columns into which labeled spectrograms $V_{lbl}$ are concatenated without any distinction of labels thereof. In this case, the number $J_{basis}$ of time frames of the spectrogram $V_{basis}$ for basis generation is the sum of the numbers $J_{lbl}$ of time frames of the labeled spectrograms $V_{lbl}$.

The learning data analysis unit 12 may, for example, perform, on an input labeled spectrogram $V_{lbl}$, supervised NMF using, as a teacher basis, the acoustic event basis $W_e$ generated by the basis generation unit 10 and thereby calculate an acoustic event activation $H_e$ that is associated with an acoustic event label. The equation (c-1) below is an approximation equation used in the supervised NMF. The equation (c-2) below is an example of an update equation used in the supervised NMF. In the supervised NMF, the learning data analysis unit 12 optimizes (updates) only the acoustic event activation $H_e$.

$$V_{lbl} \approx W_e H_e \quad \text{(c-1)}$$

[Math 4]

$$H_e \leftarrow H_e \circ \left\{ W_e^T \left( \frac{V_{lbl}}{W_e H_e} \right) \right\} / W_e^T O \quad \text{(c-2)}$$

The model learning unit 13, using the acoustic event activation $H_e$ calculated by the learning data analysis unit 12 as a feature, learns an identification model that represents a relationship between the acoustic event activation $H_e$ and an acoustic event label. The identification model learned by the model learning unit 13 is stored in the model storage unit 113.

The other features are similar to those in the first example embodiment.

Figure 4:
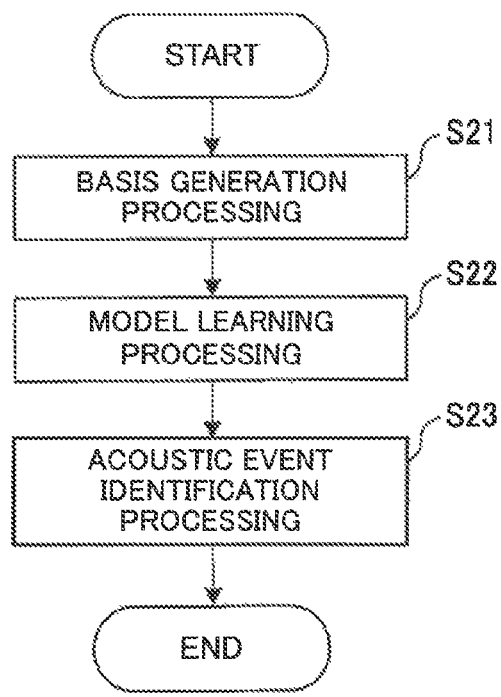
FIG. 4 is a flowchart illustrating an example of overall operation of the second example embodiment.
Figure 5:
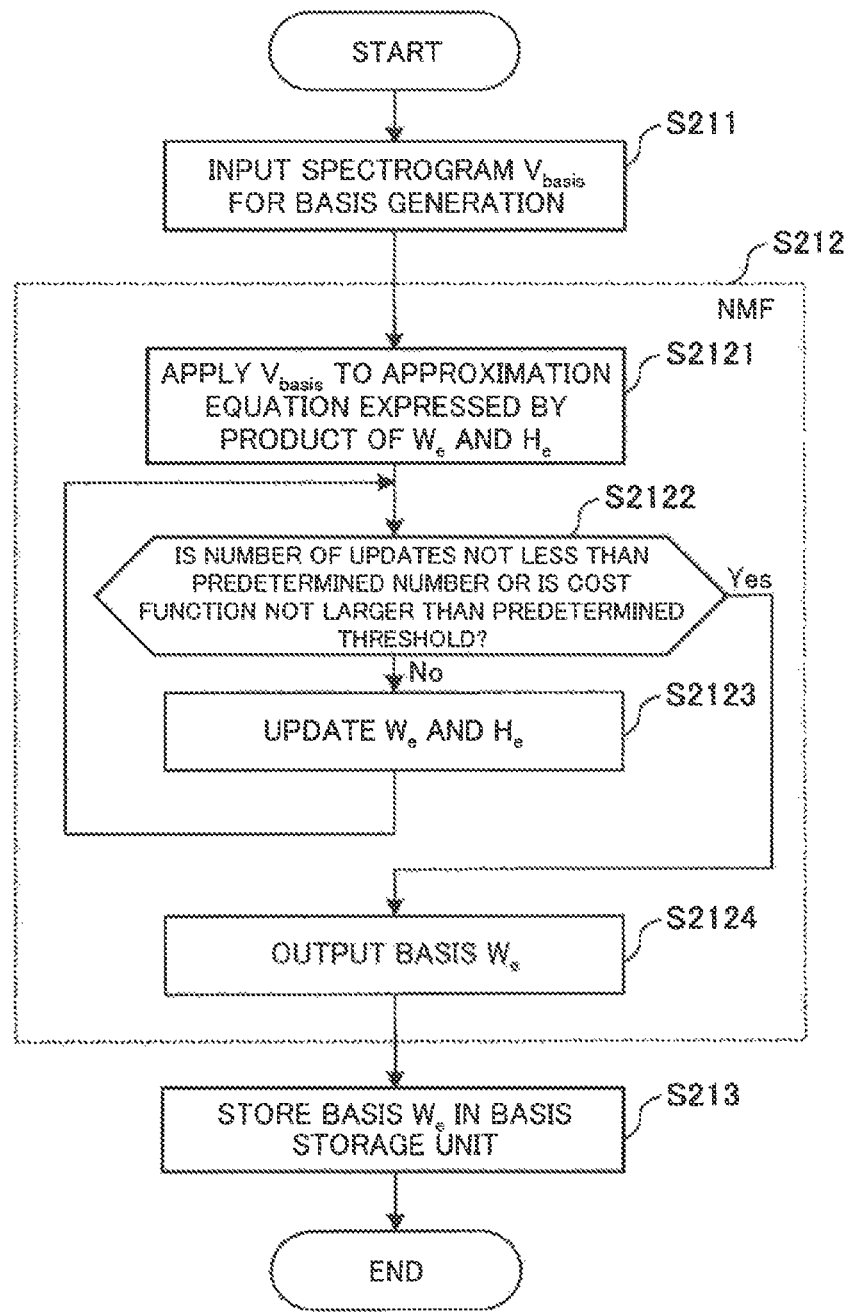
FIG. 5 is a flowchart illustrating an example of a processing flow of basis generation processing of the second example embodiment.
Figure 6:
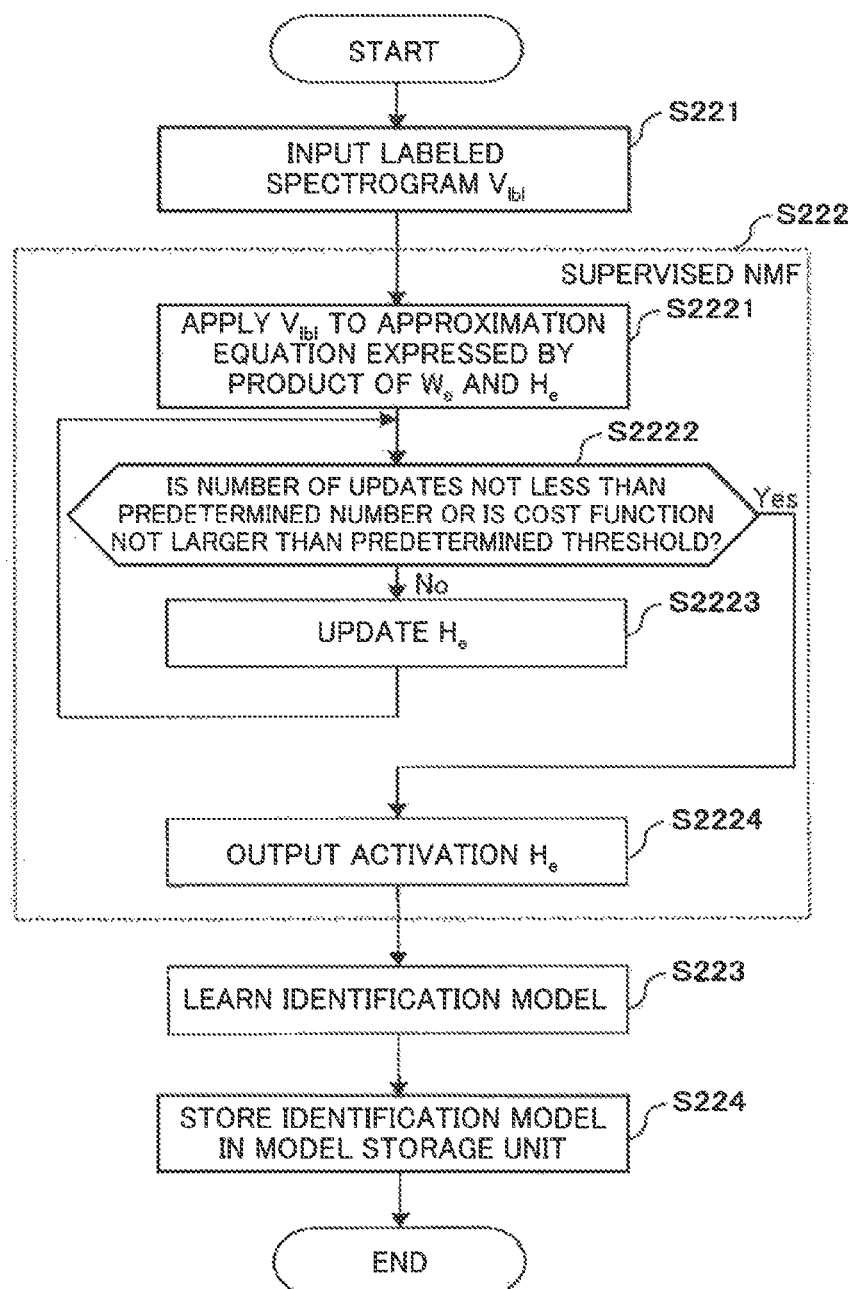
FIG. 6 is a flowchart illustrating an example of a processing flow of model learning processing of the second example embodiment.

Next, operation of the present example embodiment will be described. FIGS. 4 to 6 are flowcharts illustrating an example of the operation of the present example embodiment. Note that FIG. 4 is a flowchart illustrating an example of overall operation of the present example embodiment. As illustrated in FIG. 4, the operation of the present example embodiment is broadly divided into basis generation processing (step S21), model learning processing (step S22), and acoustic event identification processing (step S23).

FIG. 5 is a flowchart illustrating an example of a processing flow of the basis generation processing of the present example embodiment. In the basis generation processing of this example, first, a spectrogram $V_{basis}$ for basis generation is input to the signal processing device 200 (step S211).

Upon input of the spectrogram $V_{basis}$ for basis generation, the basis generation unit 10 performs NMF on $V_{basis}$ (step S212).

In step S212, the basis generation unit 10 first applies $V_{basis}$ to an approximation equation expressed by the product of $W_e$ and $H_e$ (step S2121). Next, the basis generation unit 10 determines whether the number of updates of $W_e$ and $H_e$ is greater than or equal to a predetermined number or whether a cost function is smaller than or equal to a predetermined threshold value (step S2122). On one hand, when the number of updates of $W_e$ and $H_e$ is not greater than or equal to the predetermined number and the cost function is not smaller than or equal to the predetermined threshold value (No in step S2122), the basis generation unit 10 updates either or both of $W_e$ and $H_e$ (step S2123).

On the other hand, when the number of updates of $W_e$ and $H_e$ is greater than or equal to the predetermined number or the cost function is smaller than or equal to the predetermined threshold value (Yes in step S2122), the basis generation unit 10 outputs the basis $W_e$ in the approximation equation and stores the basis $W_e$ in the basis storage unit 111 (steps S2124 and S213).

FIG. 6 is a flowchart illustrating an example of a processing flow of the model learning processing of the present example embodiment. Upon completion of the basis generation processing, the model learning processing is started. In the model learning processing of this example, first, a labeled spectrogram $V_{lbl}$ is input to the signal processing device 200 (step S221).

Upon input of the labeled spectrogram $V_{lbl}$, the learning data analysis unit 12 performs, on $V_{lbl}$, supervised NMF using, as a teacher basis, an acoustic event basis $W_e$ stored in the basis storage unit 111 (step S222).

In step S222, the learning data analysis unit 12 first applies $V_{lbl}$ to an approximation equation expressed by the product of $W_e$ and $H_e$ (step S2221). Next, the learning data analysis unit 12 determines whether the number of updates of $H_e$ is greater than or equal to a predetermined number or whether a cost function is smaller than or equal to a predetermined threshold value (step S2222). On one hand, when the number of updates of $H_e$ is not greater than or equal to the predetermined number and the cost function is not smaller than or equal to the predetermined threshold value (No in step S2222), the learning data analysis unit 12 updates $H_e$ (step S2223).

On the other hand, when the number of updates of $H_e$ is greater than or equal to the predetermined number or the cost function is smaller than or equal to the predetermined threshold value (Yes in step S2222), the learning data analysis unit 12 outputs the activation $H_e$ in the approximation equation in conjunction with an acoustic event label assigned to $V_{lbl}$ to the model learning unit 13 (step S2224).

Next, the model learning unit 13, using the output acoustic event activation $H_e$ for each label as a feature, learns an identification model that represents a relationship between the acoustic event activation $H_e$ and the acoustic event label (step S223). The model learning unit 13 stores the identification model obtained as a result of the learning in the model storage unit 113 (step S224).

Upon completion of the model learning processing, the acoustic event identification processing is started. The acoustic event identification processing of the present example embodiment may be similar to the acoustic event identification processing of the first example embodiment (steps S11 to S13 in FIG. 2).

As described above, in the present example embodiment, after generation of a basis and learning of an identification model have been performed in accordance with an acoustic event specified as a detection target, identification of an acoustic event is performed on a spectrogram V for identification. Thus, even for an acoustic signal collected under an environment where an unknown sound is present, it is possible to, with an arbitrary acoustic event targeted for detection, accurately identify an acoustic event included in a spectrogram (spectrogram V for identification) of the acoustic signal.

Third Example Embodiment

Figure 7:
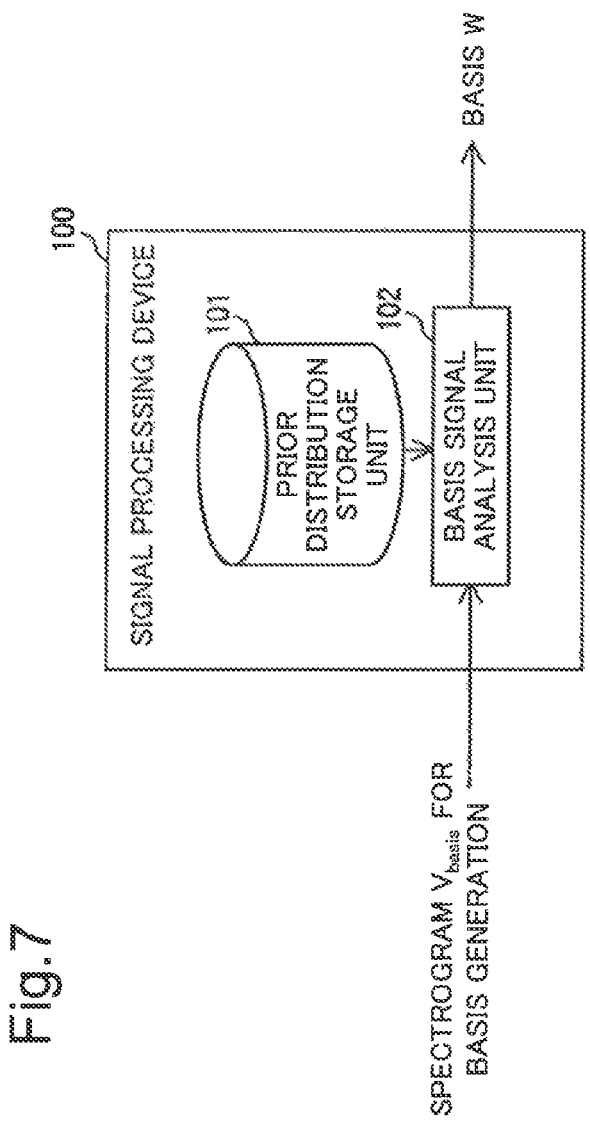
FIG. 7 is a block diagram illustrating a configuration example of a signal processing device 100 of a third example embodiment.

Next, a third example embodiment of the present disclosure will be described. FIG. 7 is a block diagram illustrating a configuration example of a signal processing device 100 of the third example embodiment. The signal processing device 100 illustrated in FIG. 7 is a device that functions as a basis generation device that, using as input a spectrogram $V_{basis}$ for basis generation and using, as a constraint, a prior distribution $W_0$ that is retained in advance, generates a spectral basis matrix W that constitutes $V_{basis}$.

As illustrated in FIG. 7, the signal processing device 100 includes a prior distribution storage unit 101 and a basis signal analysis unit 102.

The prior distribution storage unit 101 stores a prior distribution $W_0$ that is used as a constraint for preventing NMF for basis generation, which is performed by the basis signal analysis unit 102 at the succeeding stage, from falling into a local solution.

For example, an acoustic event "sound of glass being broken" is considered. At the moment when glass is broken, an impact sound with strong pulse characteristics is generated, and, subsequently, a sound of broken glass fragments flying off, which is close to a pure sound, is generated. It is considered that, on this occasion, the impact sound has a flat frequency structure and the sound of broken glass fragments flying off has a frequency structure having a sharp peak at a frequency.

Therefore, it is preferable that basis generation processing result in two spectral bases, a spectral basis having such a flat frequency structure and a spectral basis having a sharp peak. However, there exists a local solution problem in an update equation in NMF, and, thus, NMF does not always result in a desired spectral basis.

Thus, in the present example embodiment, a prior distribution $W_0$ is introduced in order to obtain a desired spectral basis avoiding a local solution. The prior distribution $W_0$ is used as a constraint parameter for causing a basis W that is to be learned in NMF for basis generation, which is performed by the basis signal analysis unit 102 at the succeeding stage, to have a high (higher than a predetermined threshold value) degree of similarity to the prior distribution $W_0$. Thus, a basis W generated by the basis signal analysis unit 102 is constrained more strongly as the degree of similarity to the prior distribution $W_0$ decreases and is thereby prevented from falling into an unexpected local solution. The introduction of such a prior distribution $W_0$ enables what basis W is learned to be controlled. In the case of the example described above, the prior distribution $W_0$ is only required to be a constraint that enables two types of spectral bases, a spectral basis having a flat frequency structure and a spectral basis having a frequency structure including a sharp peak, to be obtained.

As a generation method of a prior distribution $W_0$, R principal spectral components that represent spectral shapes assumed to be bases may be extracted manually and stored in the prior distribution storage unit 101 or R spectral components may be extracted for a spectrogram $V_0$ for distribution generation that is prepared in advance in accordance with a method described below. That is, R spectral components may be extracted by performing R-class clustering by use of a k-means method, or only R principal spectral components that have high contribution ratios may be acquired using principal component analysis.

A prior distribution $W_0$ may, for example, be a matrix with K rows and R columns, which is the same size as a basis W desired to be generated.

A spectrogram $V_0$ for distribution generation may be a spectrogram that represents representative spectra of a basis W desired to be generated. A spectrogram $V_0$ for distribution generation, for example, may be similar to a spectrogram $V_{basis}$ for basis generation or may be a spectrogram that is obtained by extracting representative spectrograms from a spectrogram $V_{basis}$ for basis generation.

The basis signal analysis unit 102 inputs a spectrogram $V_{basis}$ for basis generation and generates a basis W that represents spectral bases constituting $V_{basis}$. The basis signal analysis unit 102 performs, on the spectrogram $V_{basis}$ for basis generation, constrained NMF using a prior distribution $W_0$ stored in the prior distribution storage unit 101 as a parameter of a constraint term and thereby generates a basis W.

Although there is no specific requirement for a form of a spectrogram $V_{basis}$ for basis generation, it is assumed that a spectrogram $V_{basis}$ for basis generation includes spectra desired to be extracted as bases. Note that, when an acoustic event basis $W_e$ is generated, it is only required to input a spectrogram that includes frequency patterns of all acoustic events desired to be detected.

In the constrained NMF, the basis signal analysis unit 102, for example, by applying $V_{basis}$ to an approximation equation expressed by the equation (d-1) below and, using update equations expressed by the equations (d-2) and (d-3) below, alternately updating a basis W and an activation H, optimizes the basis W and the activation H.

$$V_{basis} \approx WH \quad (d\text{-}1)$$

[Math 5]

$$W \leftarrow W \circ \left\{ \left( \frac{V_{base}}{WH} \right) H^T + \eta \frac{W_0}{W} \right\} / (OH^T + \eta O) \quad (d\text{-}2)$$

$$H \leftarrow H \circ \left\{ W^T \left( \frac{V_{base}}{WH} \right) \right\} / W^T O \quad (d\text{-}3)$$

The two update equations described above are derived as equations for calculating a basis W and an activation H that minimize a cost function expressed by the equation (d-4) below with respect to an input spectrogram $V_{basis}$.

$$D(V,W,H,W_0) = D_{kl}(V,WH) + \eta D_{kl}(W_0,W) \quad (d\text{-}4)$$

The second term in the cost function described above is a constraint term that incurs a higher penalty as a distance between the prior distribution $W_0$ and the basis W increases. The cost function, while enabling the cost function between $V_{basis}$ and WH to be minimized by the first term, enables the basis W to have a spectral structure resembling the prior distribution $W_0$ without falling into a local solution by the second term.

In the above equation, η is a parameter for controlling the second term and takes a scalar value, such as 0.1 and 10.

Figure 8:
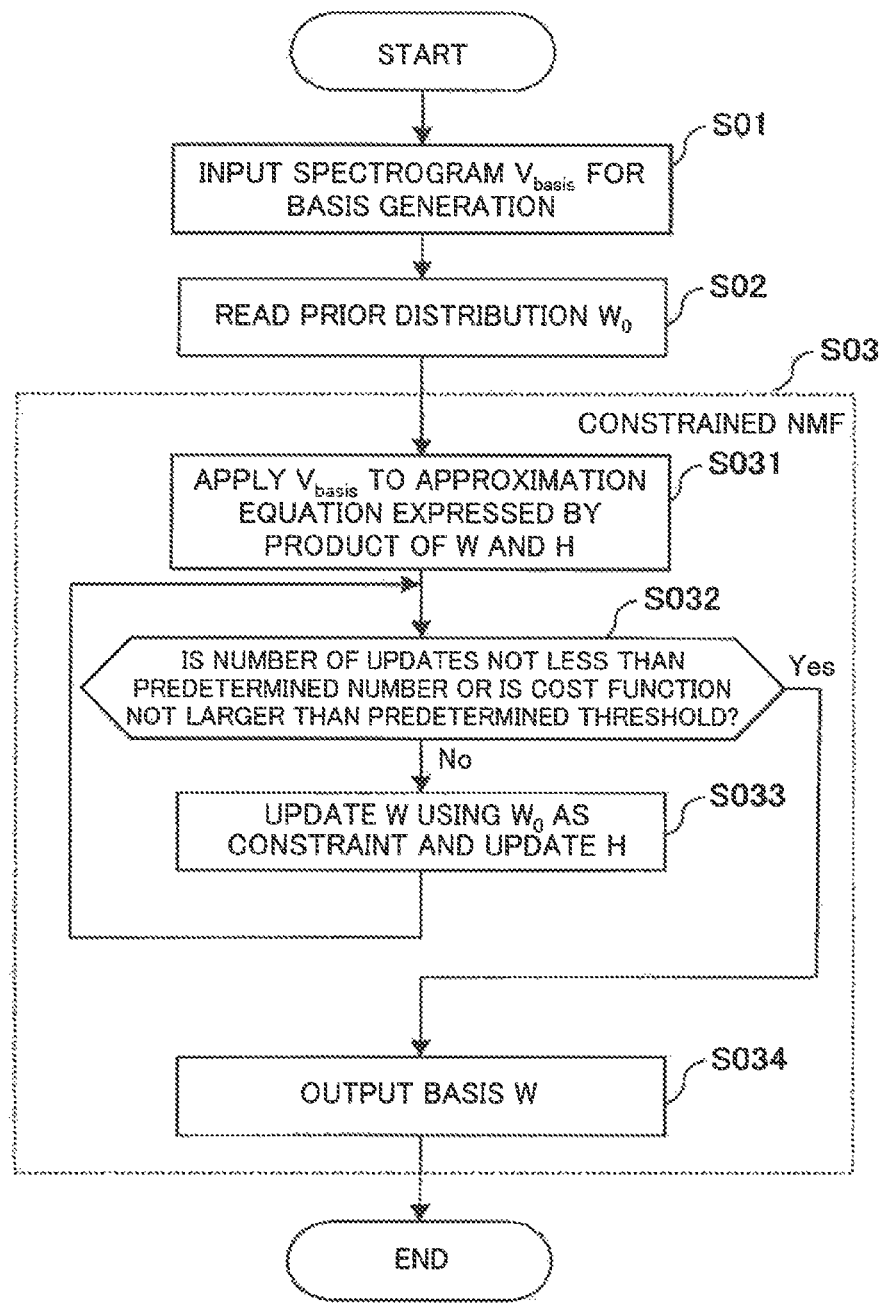
FIG. 8 is a flowchart illustrating an example of operation of the third example embodiment.

Next, operation of the present example embodiment will be described. FIG. 8 is a flowchart illustrating an example of the operation of the present example embodiment. In this example, first, a spectrogram $V_{basis}$ for basis generation is input to the signal processing device 100 (step S01).

Upon input of the spectrogram $V_{basis}$ for basis generation, the basis signal analysis unit 102 reads a prior distribution $W_0$ stored in the prior distribution storage unit 101 (step S02). The basis signal analysis unit 102 performs constrained NMF using the prior distribution $W_0$ as a constraint on $V_{basis}$ (step S03).

In step S03, the basis signal analysis unit 102 first applies $V_{basis}$ to an approximation equation expressed by the product of W and H (step S031). Next, the basis signal analysis unit 102 determines whether the number of updates of W and H is greater than or equal to a predetermined number or whether the cost function is smaller than or equal to a predetermined threshold value (step S032). On one hand, when the number of updates of W and H is not greater than or equal to the predetermined number and the cost function is not smaller than or equal to the predetermined threshold value (No in step S032), the basis signal analysis unit 102 updates either or both of W and H (step S033). Note that, in the update equation of W, a constraint term using $W_0$ is included.

On the other hand, when the number of updates of W and H is greater than or equal to the predetermined number or the cost function is smaller than or equal to the predetermined threshold value (Yes in step S032), the basis signal analysis unit 102 outputs the basis W in the approximation equation (step S034).

As described above, according to the present example embodiment, use of a constraint that causes a basis W to approach a prior distribution $W_0$ prepared in advance in NMF for basis generation enables a desired basis W to be generated without falling into a local solution.

For example, according to the signal processing device 100 of the present example embodiment, input, as a spectrogram $V_{basis}$ for basis generation, of a spectrogram including frequency patterns of all acoustic events desired to be detected enables an acoustic event basis $W_e$ of high accuracy that does not fall into a local solution to be generated. Therefore, for example, use of the signal processing device 100 of the present example embodiment, in place of the basis generation unit 10, in the configuration of the second example embodiment enables an activation $H_e$ corresponding to acoustic events to be estimated with high accuracy and identification accuracy of acoustic events to be improved.

Fourth Example Embodiment

Figure 9:
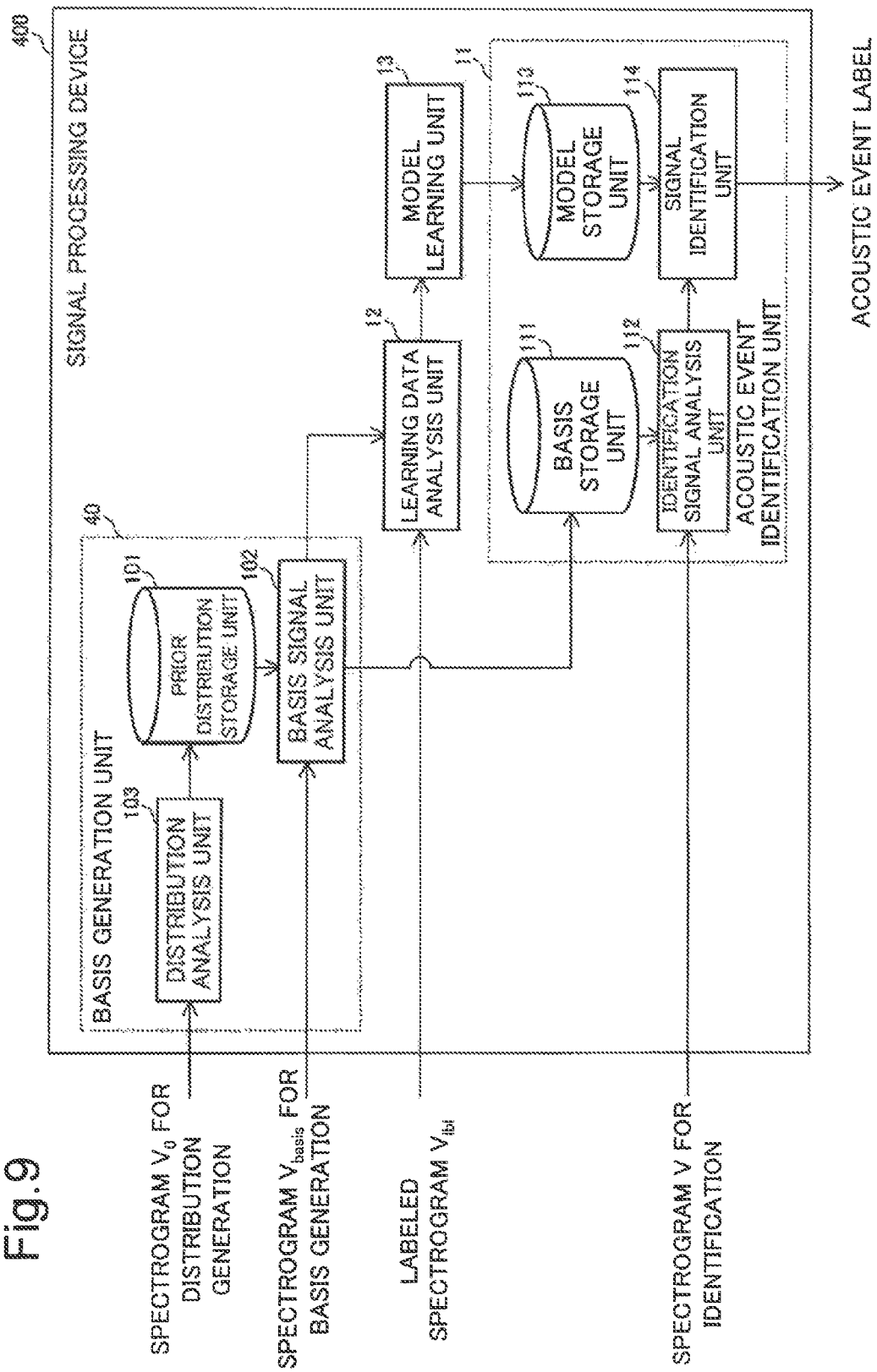
FIG. 9 is a block diagram illustrating a configuration example of a signal processing device 400 of a fourth example embodiment.

Next, a fourth example embodiment of the present disclosure will be described. FIG. 9 is a block diagram illustrating a configuration example of a signal processing device 400 of the fourth example embodiment. The signal processing device 400 illustrated in FIG. 9 includes a basis generation unit 40 in place of the basis generation unit 10 in the configuration of the second example embodiment. Note that the configuration of the basis generation unit 40 is similar to a configuration obtained by further adding a distribution analysis unit 103 to the configuration of the signal processing device 100 of the third example embodiment illustrated in FIG. 7.

The signal processing device 400 of the present example embodiment, after having input a spectrogram $V_0$ for distribution generation and generated a prior distribution $W_0$, having input a spectrogram $V_{basis}$ for basis generation and generated an acoustic event basis $W_e$ using the prior distribution $W_0$ as a constraint, and having input a labeled spectrogram $V_{lbl}$ and learned an identification model, detects an acoustic event by inputting a spectrogram V for identification and identifying an acoustic event included in V.

Hereinafter, a portion different from the second example embodiment will be mainly described.

A prior distribution storage unit 101 stores a prior distribution $W_0$ that is used as a constraint for preventing NMF for basis generation, which is performed by a basis signal analysis unit 102 at the succeeding stage, from falling into a local solution. The prior distribution storage unit 101 of the present example embodiment stores a prior distribution $W_0$ that the distribution analysis unit 103 generated and that serves as a constraint for respective spectral bases of an acoustic event.

The basis signal analysis unit 102 inputs a spectrogram $V_{basis}$ for basis generation and generates a basis W that represents spectral bases constituting $V_{basis}$. As a generation method of a basis, as with the third example embodiment, constrained NMF using a prior distribution $W_0$ stored in the prior distribution storage unit 101 as a parameter of a constraint term is used.

Note that the basis signal analysis unit 102 of the present example embodiment inputs a spectrogram $V_{basis}$ for basis generation including frequency patterns of all acoustic events desired to be detected and generates an acoustic event basis $W_e$.

The distribution analysis unit 103, using as input a spectrogram $V_0$ for distribution generation, generates a prior distribution $W_0$ for an acoustic event basis $W_e$. The distribution analysis unit 103 may, for example, generate, as a prior distribution, a matrix $W_0(k, r)$ with K rows and $R_e$ columns, which is the same size as an acoustic event basis $W_e$.

The distribution analysis unit 103 may, for example, generate a prior distribution $W_0$ by performing R-class clustering using a k-means method on a spectrogram $V_0$ for distribution generation. The distribution analysis unit 103 may, for example, acquire a prior distribution $W_0$ by performing principal component analysis on $V_0$ and extracting only R principal spectral components that have high contribution ratios.

Figure 10:
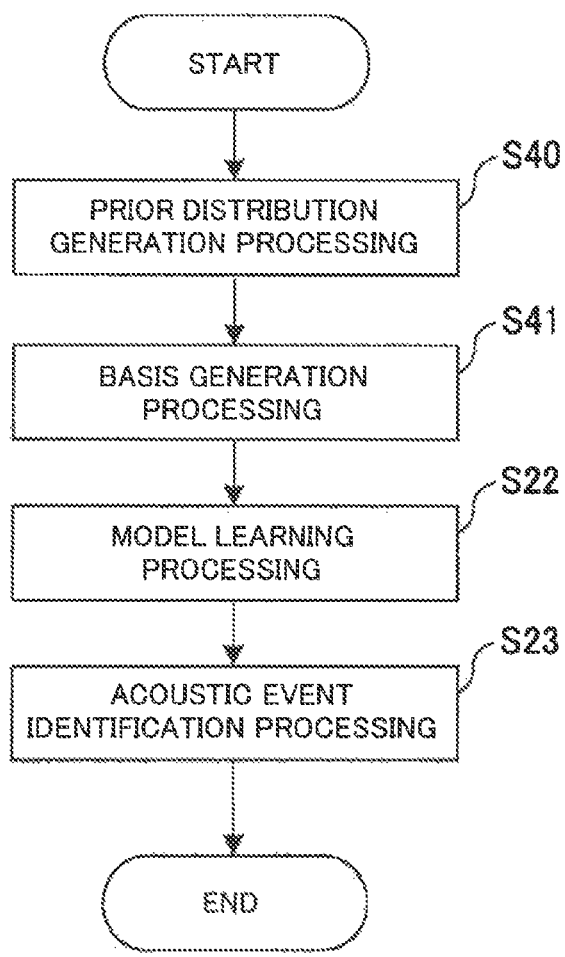
FIG. 10 is a flowchart illustrating an example of overall operation of the fourth example embodiment.

Next, operation of the present example embodiment will be described. FIG. 10 is a flowchart illustrating an example of overall operation of the present example embodiment. As illustrated in FIG. 10, the operation of the present example embodiment is broadly divided into prior distribution generation processing (step S40), basis generation processing (step S41), model learning processing (step S22), and acoustic event identification processing (step S23).

In the prior distribution generation processing in step S40, the distribution analysis unit 103 generates a prior distribution $W_0$ from a spectrogram $V_0$ for distribution generation and stores the generated prior distribution $W_0$ in the prior distribution storage unit 101.

In the basis generation processing in step S41, the basis signal analysis unit 102 performs the same processing as the basis generation processing (steps S01 to S034) of the third example embodiment illustrated in FIG. 8 and stores a generated basis W in a basis storage unit 111 as an acoustic event basis $W_e$.

Note that the model learning processing (step S22) and the acoustic event identification processing (step S23) may be similar to those in the second example embodiment.

Since the signal processing device 400 of the present example embodiment enables an acoustic event basis $W_e$ of high accuracy to be generated that does not fall into a local solution, it is possible to estimate an activation $H_e$ corresponding to acoustic events with high accuracy in a learning phase. In addition, even for an acoustic signal collected under an environment where an unknown sound is present, the signal processing device 400 of the present example embodiment enables an acoustic event that is not a detection target to be suppressed from being falsely detected and an acoustic event included in a spectrogram (spectrogram V for identification) of such an acoustic signal to be identified with high accuracy.

Fifth Example Embodiment

Figure 11:
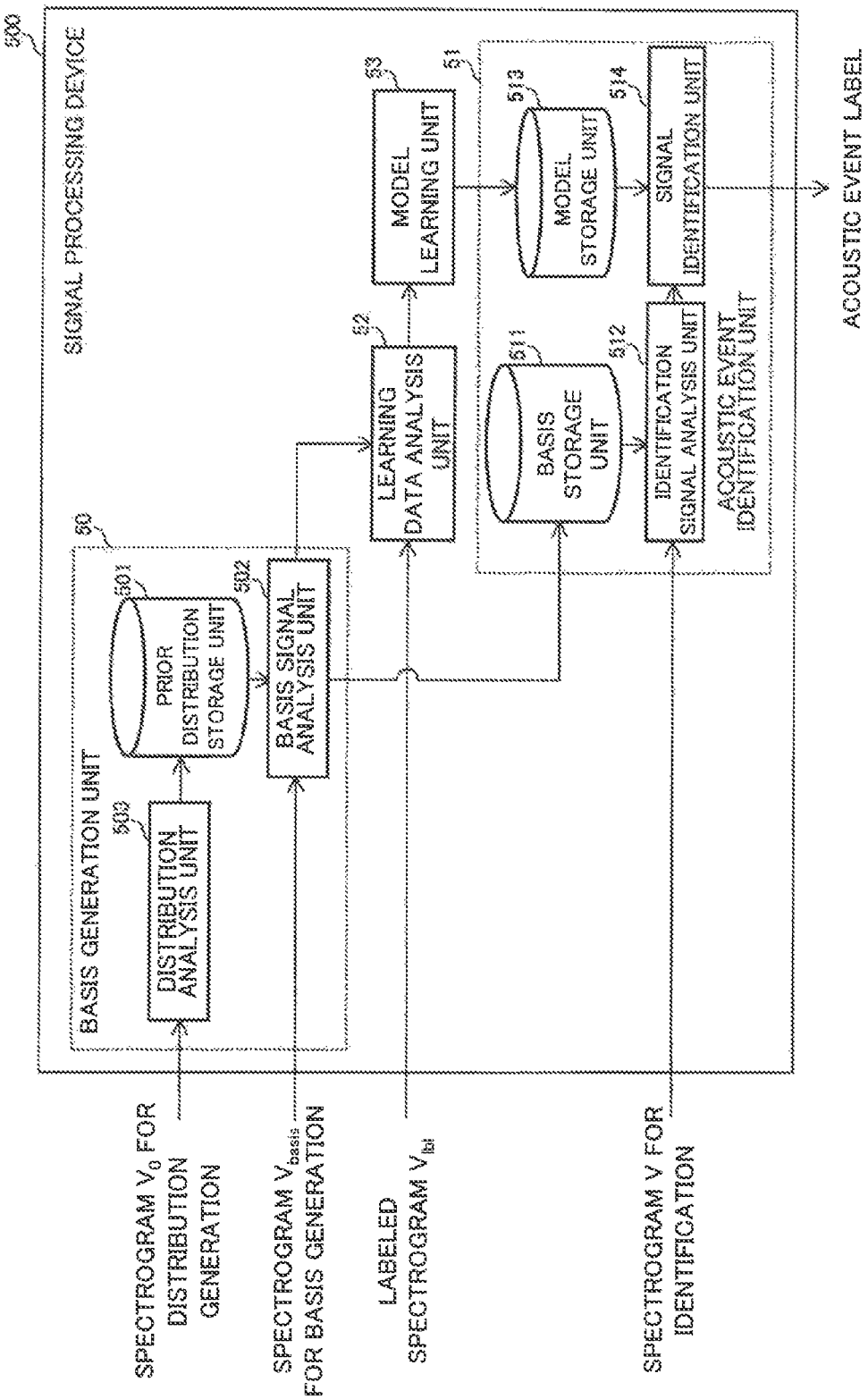
FIG. 11 is a block diagram illustrating a configuration example of a signal processing device 500 of a fifth example embodiment.

Next, a fifth example embodiment of the present disclosure will be described. FIG. 11 is a block diagram illustrating a configuration example of a signal processing device 500 of the present example embodiment. The signal processing device 500 illustrated in FIG. 11 includes a basis generation unit 50, a learning data analysis unit 52, a model learning unit 53, and an acoustic event identification unit 51.

The basis generation unit 50 includes a distribution analysis unit 503, a prior distribution storage unit 501, and a basis signal analysis unit 502. The acoustic event identification unit 51 includes a basis storage unit 511, an identification signal analysis unit 512, a model storage unit 513, and a signal identification unit 514.

Note that input and output to and from the signal processing device 500 of the present example embodiment are similar to those for a signal processing device of the fourth example embodiment. The distribution analysis unit 503, the prior distribution storage unit 501, the model learning unit 53, the model storage unit 513, and the signal identification unit 514 are similar to the distribution analysis unit 103, the prior distribution storage unit 101, the model learning unit 13, the model storage unit 113, and the signal identification unit 114 of the fourth example embodiment, respectively. Hereinafter, a portion different from the fourth example embodiment will be mainly described.

The basis signal analysis unit 502, using as input a spectrogram $V_{basis}$ for basis generation, by means of constrained NMF using a prior distribution $W_0$ stored in the prior distribution storage unit 501 in a constraint term, generates a basis $W_g$ in which spectral bases constituting $V_{basis}$ are expressed in a grouped manner.

The basis signal analysis unit 502 may, for example, upon input of a spectral matrix with K rows and $J_{basis}$ columns as $V_{basis}$, calculate a basis matrix $W_g(k, r)=[W^{(1)}(k, g), \ldots, W^{(r)}(k, g), \ldots, W^{(R)}(k, g)]$ with K rows and (G×R) columns by means of constrained NMF using a prior distribution $W_0(k, r)=[w_0(1), \ldots, w_0(r), \ldots, w_0(R)]$, which is a matrix with K rows and R columns, as a parameter of a constraint term.

In the above expression of the prior distribution $W_0(k, r)$, $w_0(r)$ represents an r-th column vector in the prior distribution $W_0$, that is, a constraint for an r-th spectral basis. In addition, $W^{(r)}(k, gr)$ represents a group (spectral basis matrix) made up of G spectral bases that are generated using $w_0(r)$ as a constraint. Further, gr is an index indicating a g-th spectral basis among G spectral bases in a basis group specified by r. Note that the number G of spectral bases included in each basis group (the number of elements in a group) may be variable.

In the constrained NMF, the basis signal analysis unit 502 simultaneously optimizes $W^{(r)}(k, g)$ and an activation matrix $H^{(r)}(g, j)=[h_1^{(r)}, \ldots, h_j^{(r)}, \ldots, h_J^{(r)}]$ corresponding to $W^{(r)}(k, g)$ by repeating updates in accordance with update equations expressed by the equations (e-1), (e-2), and (e-3) below in turn until the amount of change in $W^{(r)}$ and $H^{(r)}$ in an update becomes less than or equal to a threshold value or the number of updates reaches a preset number.

[Math 6]

$$W^{(r)} \leftarrow W^{(r)} \circ \left\{\left(\frac{V_{base}}{W^{(r)}H^{(r)}}\right)H^{(r)T} + \eta \frac{w_0(r)}{W^{(r)}}\right\} / (OH^{(r)T} + \eta O) \quad (e\text{-}1)$$

$$H^{(r)} \leftarrow H^{(r)} \circ \left\{W^{(r)T}\left(\frac{V_{base}}{W^{(r)}H^{(r)}}\right)\right\} / W^{(r)T}O \quad (e\text{-}2)$$

$$h_j^{(r)} \leftarrow h_j^{(r)} / (1 + \lambda/(\varepsilon + \|h_j^{(r)}\|)) \quad (e\text{-}3)$$

In the above equations, $h_j^{(r)}$ is an activation corresponding to a basis matrix $W^{(r)}$ of a group r and is a column vector representing activation levels of the respective spectral bases of $W^{(r)}$ at a time index j.

The equation (e-3) described above is a sparse constraint with respect to an activation $h_j^{(r)}$ of a basis matrix $W^{(r)}$ of a group r. The constraint is configured to be a constraint that makes $h_j^{(r)}$ having a large value likely to take a larger value as the update thereof proceeds and $h_j^{(r)}$ having a small value likely to take a smaller value as the update thereof proceeds and configured to enable a more characteristic $W^{(r)}$ to be extracted.

In the third and fourth example embodiments, each spectral basis w(r) corresponded to one prior distribution $w_0(r)$. In the present example embodiment, a plurality of (G) spectral bases $w_g(r)$ are associated with each prior distribution $w_0(r)$ in a grouped manner.

Hereinafter, a basis matrix $W_g(k, gr)$ that the basis signal analysis unit 502 generates is sometimes referred to as a group basis $W_g$.

When, for example, an acoustic event "sound of glass being broken" is considered, while each of an impact sound at the moment when glass is broken and a sound of broken glass fragments flying off was expressed by one spectral basis in the third and fourth example embodiments, variations and fluctuations with respect to each sound may be expressed as a group in the present example embodiment. Performing NMF using a group basis $W_g$ expressed in this manner enables sound source separation to be performed with higher accuracy.

In the present example embodiment, a spectrogram $V_{basis}$ for basis generation is preferably a spectrogram that includes two or more variations or fluctuations with respect to each of frequency patterns of all acoustic events desired to be detected. As an example, a spectrogram $V_{basis}$ for basis generation may be a matrix $V_{basis}(k, j)=[V_{lbl\_11}(k, V_{lbl\_12}(k, j), \ldots, V_{lbl\_1G}(k, j), V_{lbl\_21}(k, j), \ldots, V_{lbl\_EG}(k, j)]$ with K rows and $J_{basis}$ columns into which labeled spectrograms $V_{lbl}$ that are obtained from a plurality of samples for each acoustic event are concatenated without any distinction of labels thereof.

The group basis $W_g$ generated by the basis signal analysis unit 502 is stored in the basis storage unit 511.

The learning data analysis unit 52, using as input a labeled spectrogram $V_{lbl}$, calculates an activation $H_g$ corresponding to the group basis $W_g$ with respect to each label.

The learning data analysis unit 52 may, for example, upon input of a matrix with K rows and $J_{lbl}$ columns as a labeled spectrogram $V_{lbl}$, calculate a group acoustic event activation $H_g$ that is associated with an acoustic event label by performing supervised NMF using, as a teacher basis, the group basis $W_g(k, gr)$ generated by the basis signal analysis unit 502 and thereby approximating $V_{lbl}$ with the product of $W_g$ and $H_g$.

For example, when a group basis $W_g(k, gr)$ is a matrix with K rows and (G×R) columns, a group acoustic event activation $H_g(gr, j)$ becomes a matrix with (G×R) rows and J columns.

Each of column vectors $h_j$ in $H_g(gr, j)$ is equivalent to a vector into which, assuming that r in $h_j^{(r)}$ takes values of 1 to R, the respective column vectors $h_j^{(r)}$ are concatenated in the column the row direction.

Since NMF that the leaning data analysis unit 52 performs is supervised NMF, updates are performed only on $H_g$ as expressed by the equation (f-1) below. However, in the updates of $H_g$, a sparse constraint expressed by the equation (e-3) described above is also applied to the respective vectors $h_j^{(r)}$. The learning data analysis unit 52, for example, alternately updates the two equations, the equations (f-1) and (e-3).

[Math 7]

$$H_g \leftarrow H_g \circ \left\{ W_g^T \left( \frac{V_{lbl}}{W_g H_g} \right) \right\} / W_g^T O \quad (f\text{-}1)$$

The model learning unit 53, using, as a feature, each activation $H_g$ associated with an acoustic event label, which is calculated by the learning data analysis unit 52, learns an identification model that represents a relationship between the activation $H_g$ and the acoustic event label. Note that, since the only difference from the model learning unit 13 is a difference in the number of rows in an activation matrix, a learning method of an identification model may be similar to that used by the model learning unit 13.

The identification signal analysis unit 512, using as input a spectrogram V for identification, performs semi-supervised NMF using a group basis $W_g$ stored in the basis storage unit 511 as a teacher basis and thereby calculates an activation $H_g$ that represents activation levels by means of weights on the respective spectral bases included in the group basis $W_g$.

The identification signal analysis unit 512 may, for example, use semi-supervised NMF using, as a spectral basis used for sound source separation, a basis matrix $W_{gsemi}[W_g \ W_u]$ that is obtained by concatenating a group basis matrix $W_u$ corresponding to a sound from an unknown sound source to a group basis matrix $W_g$ corresponding to sounds from respective sound sources that are defined as separation targets in advance. The method of semi-supervised NMF is basically similar to the method used by the identification signal analysis unit 112 in the first example embodiment. That is, the method of semi-supervised NMF may be basically similar to that in the identification signal analysis unit 112 except that $W_{semi}[W_e \ W_u]$ and $H_{semi}[H_e \ H_u]$ are replaced with $W_{gsemi}[W_g \ W_u]$ and $H_{gsemi}[H_g \ H_u]$, respectively. However, in an update of $H_{gsemi}$, a sparse constraint expressed by the equation (e-3) described above is applied to the respective vectors $h_j^{(r)}$ in $H_g$. The identification signal analysis unit 512, for example, calculates $H_g$, $H_u$, and $W_u$ by alternately updating three equations, the equations (a-2), (a-3), and (e-3).

Note that, although the identification signal analysis unit 512 may calculate $H_g$ by performing regular supervised NMF using only $W_g$ without using $W_u$, it is preferable to use semi-supervised NMF using $W_u$ when an acoustic event is to be detected from an acoustic signal collected under an unknown environment.

As described above, according to the present example embodiment, grouping spectral bases enables a spectrogram for identification to be factorized using a basis matrix that expresses variations or fluctuations of components constituting a sound. Thus, even when frequency patterns constituting an acoustic event included in a spectrogram for identification slightly vary or include fluctuations, it is possible to calculate components constituting the spectrogram for identification with higher accuracy.

Sixth Example Embodiment

Figure 12:
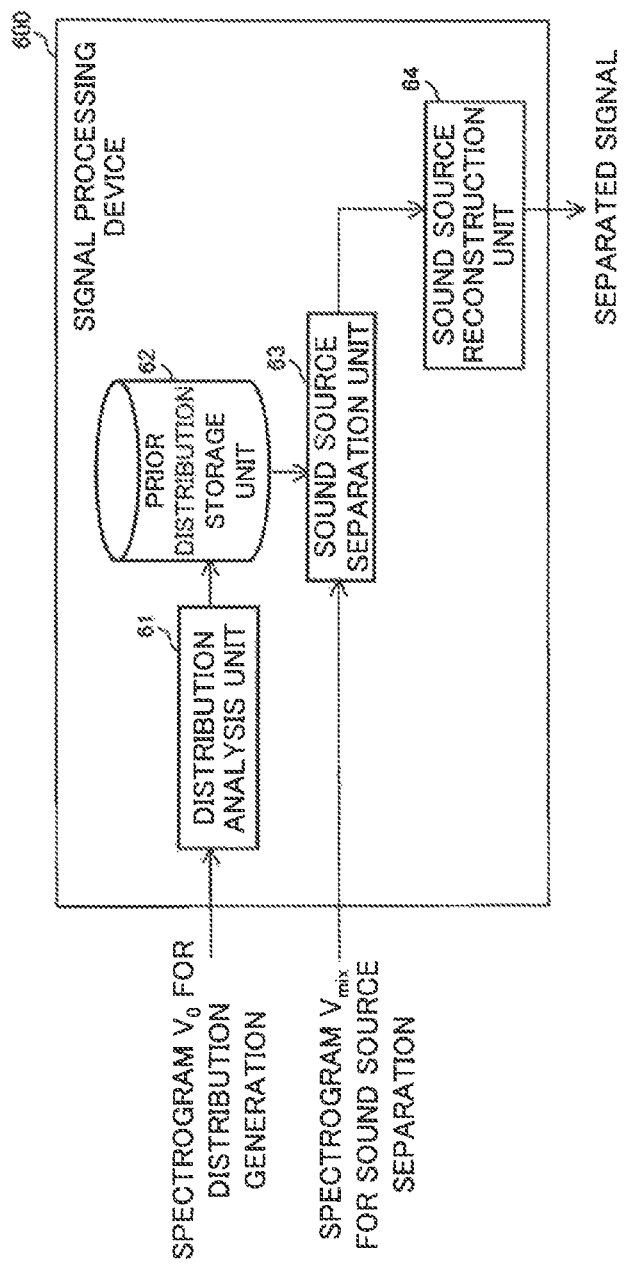
FIG. 12 is a block diagram illustrating a configuration example of a signal processing device 600 of a sixth example embodiment.

Next, a sixth example embodiment of the present disclosure will be described. FIG. 12 is a block diagram illustrating a configuration example of a signal processing device 600 of the present example embodiment. The signal processing device 600 illustrated in FIG. 12 includes a distribution analysis unit 61, a prior distribution storage unit 62, a sound source separation unit 63, and a sound source reconstruction unit 64.

The signal processing device 600 of the present example embodiment is a device that functions as a sound source separation device that, using as input a spectrogram $V_O$ for distribution generation from respective sound sources desired to be separated, generates a prior distribution and, using as input a spectrogram $V_{mix}$ for sound source separation, performs sound source separation by means of NMF using a generated prior distribution as a constraint.

The following description will be made using, as an example, a case where an acoustic signal in which a voice and an environmental noise are mixed is separated into a voice signal that is a signal including only the voice and a noise signal that is a signal including only the environmental noise.

A spectrogram $V_O$ for distribution generation in the present example embodiment is a spectrogram that is generated from an acoustic signal including sounds from only sound sources that are separation targets. For example, when an acoustic signal is to be separated into a voice signal and an environmental noise signal, a spectrogram $V_O$ for distribution generation is a spectrogram $V_O[V_{O\_s} \ V_{O\_n}]$ that is made up of a spectrogram $V_{O\_s}$ of the voice signal and a spectrogram $V_{O\_n}$ of the environmental noise signal.

On the other hand, a spectrogram $V_{mix}$ for sound source separation is a spectrogram calculated from an acoustic signal in which a voice and an environmental noise are mixed.

The distribution analysis unit 61, using as input a spectrogram $V_O$ for distribution generation, generates a prior distribution $W_O[W_{O\_s} \ W_{O\_n}]$ of spectral bases constituting $V_O$ and stores the generated prior distribution $W_O[W_{O\_s} \ W_{O\_n}]$ in the prior distribution storage unit 62.

For example, the distribution analysis unit 61 may generate prior distributions $W_{O\_s}$ and $W_{O\_n}$ by, on each of the spectrograms $V_{O\_s}$ and $V_{O\_n}$ included in the spectrogram $V_O$ for distribution generation, performing clustering into a predetermined number of classes using a k-means method. For example, the distribution analysis unit 103 may acquire prior distributions $W_{O\_s}$ and $W_{O\_n}$ by performing principal component analysis on each of $V_{O\_s}$ and $V_{O\_n}$ and extracting principal spectral components that have high contribution ratios.

When it is assumed that $R_s$ and $R_n$ denote the number of bases of a voice signal and the number of bases of an environmental noise signal, respectively, $W_O$ may be a matrix with K rows and $(R_s+R_n)$ columns into which the matrix $W_{O\_s}$ with K rows and $R_s$ columns and the matrix $W_{O\_n}$ with K rows and $R_n$ columns are concatenated in the column direction.

The sound source separation unit 63, using as input a spectrogram $V_{mix}$ for sound source separation, performs constrained NMF using, as a constraint, a prior distribution $W_O[W_{O\_s} \ W_{O\_n}]$ that corresponds to respective sound sources specified as separation targets and is stored in the prior distribution storage unit 62 and thereby factorizes $V_{mix}$ into $W_{sepa}[W_s \ W_n]$ and an activation $H_{sepa}[H_s \ H_n]$ thereof.

$$V_{mix} \approx W_{sepa} H_{sepa} \quad (g\text{-}1)$$

The equation (g-1) is an approximation equation of $V_{mix}$ in the constrained NMF in the example described above. In the equation, $W_{sepa}$ is a basis matrix with K rows and $(R_s+R_n)$ columns into which a basis $W_s$ of a voice signal and a basis $W_n$ of an environmental noise signal are concatenated in the column direction. The respective column indices of $W_{sepa}$ are indices that correspond to the indices of $W_0[W_{0\_s} W_{0\_n}]$. In addition, $H_{sepa}$ is an activation matrix with $(R_s + R_n)$ rows and $J_{mix}$ columns into which an activation $H_s$ corresponding to the basis $W_s$ and an activation $H_n$ corresponding to the basis $W_n$ are concatenated in the row direction. The respective row indices of $H_{sepa}$ are indices that correspond to the column indices of $W_{sepa}$.

The bases $W_s$ and $W_n$ in the example are a matrix with K rows and $R_s$ columns and a matrix with K rows and $R_n$ columns, respectively. The activations $H_s$ and $H_n$ are a matrix with $R_s$ rows and $J_{mix}$ columns and a matrix with $R_n$ rows and $J_{mix}$ columns, respectively. In the above denotations, $J_{mix}$ is the number of time indices of a spectrogram $V_{mix}$ for sound source separation.

For the constrained NMF, the constrained NMF used by the basis signal analysis unit 102 in the third example embodiment or the constrained NMF used by the basis signal analysis unit 502 in the fifth example embodiment may be used.

In the former case, $V_{basis}$, W, and H in the equations (d-2) and (d-3) described above are only required to be replaced with $V_{mix}$, $W_{sepa}$, and $H_{sepa}$, respectively. In the latter case, a basis matrix $W_i$ and an activation $H_i$ thereof that are learned with respect to a prior distribution corresponding to each sound source i correspond to a group basis matrix $W^{(r)}$ and an activation $H^{(r)}$ thereof, respectively. On this occasion, as associations in basis indices of respective sound sources between $W_0$ and $W_{sepa}$, an index gr, which is tailored to grouping, is only required to be used for a column vector in $W_{sepa}$ with respect to an index r of a column vector in $W_0$.

The sound source separation unit 63, by performing constrained NMF using a prior distribution as a constraint, may calculate bases and activations thereof with respect to the respective sound sources without falling into a local solution, which becomes a problem when regular NMF without constraint is used. Note that, when performing sound source separation, the sound source separation unit 63 may perform constrained semi-supervised NMF in which bases corresponding to an unknown sound source are further added. In that case, the sound source separation unit 63 may perform the sound source separation by causing spectral bases corresponding to the sound sources that are separation targets to be learned using a prior distribution as a constraint and causing spectral bases corresponding to the unknown sound source to be learned without constraint.

The sound source separation unit 63 outputs $W_{sepa}[W_s W_n]$ and $H_{sepa}[H_s H_n]$ obtained in this way. Note that the sound source separation unit 63 may output basis matrices and activation matrices into which $W_{sepa}$ and $H_{sepa}$ are respectively separated with respect to each sound source.

The sound source reconstruction unit 64, using as input the basis matrix $W_{sepa}$ including spectral bases corresponding to the respective sound sources and the activation matrix $H_{sepa}$ thereof, which are output from the sound source separation unit 63, estimates a spectrogram from each sound source included in $V_{mix}$ by calculating the product of portions of $W_{sepa}$ and $H_{sepa}$ that correspond to basis indices of the sound source. The sound source reconstruction unit 64, for example, calculates a spectrogram $V_s$ of the voice signal and a spectrogram $V_n$ of the environmental noise signal as estimates of spectrograms from the respective sound sources included in $V_{mix}$, as expressed by the equations (g-2) and (g-3) below.

$$V_s = W_s H_s \quad (g\text{-}2)$$

$$V_n = W_n H_n \quad (g\text{-}3)$$

This is because, since $W_s$ in $W_{sepa}$ represents spectral components of the voice signal and $H_s$ in $H_{sepa}$ represents activation levels of the spectral components of the voice signal at respective time indices, it is possible to extract the spectrogram $V_s$ corresponding to only the voice signal components in $V_{mix}$ by calculating a product using only the components represented by $W_s$ and $H_s$. Note that the same applies to the spectrogram of the environmental noise signal. Hereinafter, estimated values of a spectrogram from each sound source that are estimated in this manner are sometimes expressed as $V_{sepa\_i}$. In the above denotation, i denotes an identifier of a sound source.

The sound source reconstruction unit 64 generates a separated signal $x_i(t)$ by inverse Fourier transforming an estimated spectrogram $V_{sepa\_i}$ from each sound source into a time series acoustic signal.

Note that, although, in this example, the description was made using, as an example, a case where two types of sound sources, a voice and an environmental noise, are separated, two or more desired types of sound sources, such as a voice, an environmental noise, and background music, may also be separated. In that case, each of a prior distribution $W_0$, a basis matrix $W_{sepa}$, and an activation matrix $H_{sepa}$ is only required to be constituted by concatenating elements corresponding to respective sound sources according to the number of sound sources. More specifically, a prior distribution $W_0$ is only required to be constituted by concatenating prior distributions $W_{0\_i}$ of the respective sound sources in the column direction. A basis matrix $W_{sepa}$ is only required to be constituted by concatenating spectral basis matrices $W_i$ of the respective sound sources in the column direction. An activation matrix $H_{sepa}$ is only required to be constituted by concatenating activation matrices $H_i$ corresponding to the spectral basis matrices $W_i$ of the respective sound sources in the row direction. Note that, as described above, a separated signal may be obtained by calculating the product of a basis matrix $W_i$ and an activation matrix $H_i$ thereof corresponding to each sound source.

Figure 13:
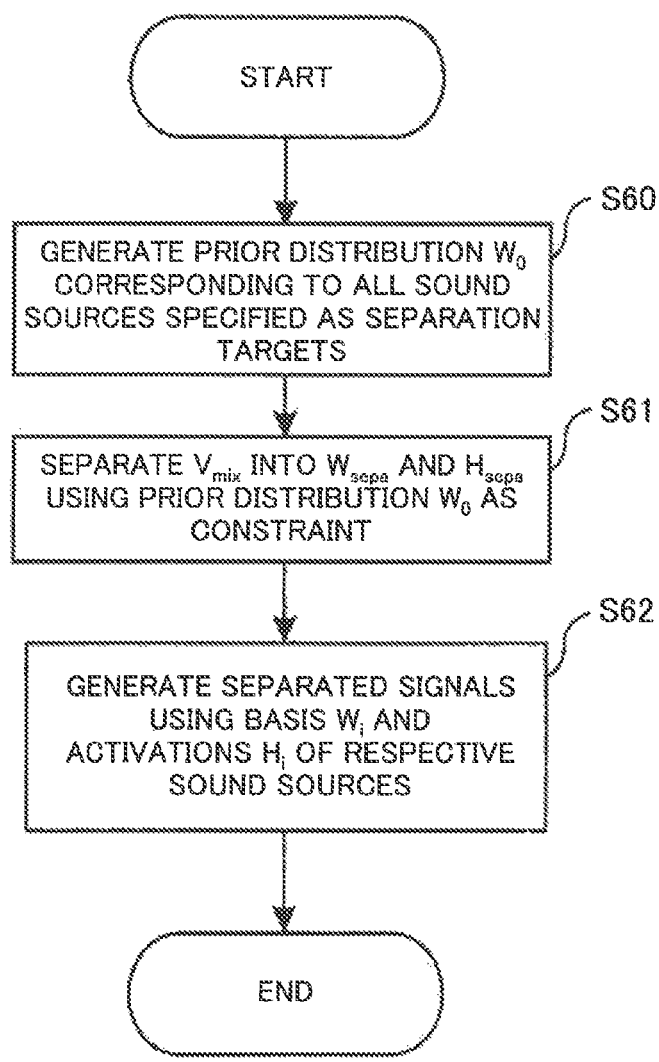
FIG. 13 is a flowchart illustrating an example of operation of the sixth example embodiment.

FIG. 13 is a flowchart illustrating an example of operation of the present example embodiment. In the example illustrated in FIG. 13, first, the distribution analysis unit 61, using as input a spectrogram $V_0$ for distribution generation, generates a prior distribution $W_0[W_{0\_1} \ldots, W_{0\_i}, \ldots]$ of spectral bases of respective sound sources constituting $V_0$ and stores the generated prior distribution $W_0[W_{0\_1}, \ldots, W_{0\_i}, \ldots]$ in the prior distribution storage unit 62 (step S60).

Next, the sound source separation unit 63 performs, on a spectrogram $V_{mix}$ for sound source separation, constrained NMF using a prior distribution $W_0$ corresponding to the respective sound sources as a constraint and thereby factorizes $V_{mix}$ into $W_{sepa}[W_1, \ldots, W_i, \ldots]$ and an activation $H_{sepa}[H_1, \ldots, H_i, \ldots]$ thereof (step S61).

Next, the sound source reconstruction unit 64, using a spectral basis $W_3$ of a specified sound source within $W_{sepa}$ and an activation $H_3$ thereof, generates a separated signal that is a time series acoustic signal from only the specified sound source (step S62).

As described above, according to the present example embodiment, when basis matrices $W_i$ corresponding to respective sound sources are learned using NMF, use of a constraint that causes $W_i$ to approach prior distributions $W_{0\_i}$ that are calculated from a spectrogram $V_0$ for distribution generation, which is input separately, enables desired basis matrices $W_i$ to be calculated without falling into a local solution. Thus, it is possible to perform sound source separation with higher accuracy.

Note that, although, in the example illustrated in FIGS. 12 and 13, an example in which a spectrogram $V_O$ for distribution generation is input and the distribution analysis unit 61 generates prior distributions corresponding to spectral bases of respective sound sources was described, the prior distributions may be stored in the prior distribution storage unit 62 in advance. In that case, the distribution analysis unit 61 may be omitted.

Note that, although, in the respective example embodiments described above, the description was made assuming that all bases do not depend on time width in NMF, it is also possible to generate bases including time structures by use of convolutive-NMF.

The respective example embodiments described above not only are achieved by a single device but also may be implemented by a system made up of a plurality of devices. Further, the respective example embodiments described above may be achieved by directly or remotely supplying a system or a device with an information processing program that achieves functions of the respective example embodiments. Therefore, a program that is installed in a computer to achieve functions of the respective example embodiments described above by means of the computer, a medium storing the program, and a world wide web (WWW) server and the like that allow the program to be downloaded are included in the scope of the present disclosure. In particular, at least a non-transitory computer readable medium that stores a program for causing a computer to execute processing steps included in the respective example embodiments described above is included in the scope of the present disclosure.

The respective example embodiments described above may be described as in the following supplementary notes.

(Supplementary note 1) A signal processing device including:

a basis storage means (for example, the basis storage unit 111 or 511) for storing an acoustic event basis group that is a set of spectral bases of an acoustic event specified as a detection target;

a model storage means (for example, the model storage unit 113 or 513) for storing an identification model for, using, as a feature, a combination of activation levels of spectral bases of an acoustic event in a period of a spectrogram of an acoustic signal, identifying an acoustic event included in the acoustic signal;

an identification signal analysis means (for example, the identification signal analysis unit 112 or 512) for, upon input of a spectrogram of an acoustic signal for identification, performing sound source separation on the spectrogram by using a spectral basis set that is obtained by appending spectral bases corresponding to an unknown acoustic event that is an acoustic event other than the acoustic event specified as a detection target to the acoustic event basis group and causing only unknown spectral bases within the spectral basis set to be learned, and thereby calculating activation levels of spectral bases of the acoustic events in the spectrogram of the acoustic signal for identification; and a signal identification means (for example, the signal identification unit 114 or 514) for identifying an acoustic event included in the acoustic signal for identification, based on a combination of the calculated activation levels, using an identification model.

(Supplementary note 2) The signal processing device according to supplementary note 1, wherein the identification signal analysis means, for the spectrogram of the acoustic signal for identification, by causing, within a third basis matrix that is obtained by concatenating a second basis matrix representing a spectral basis group of the unknown acoustic event to a first basis matrix of a predetermined form representing the acoustic event basis group, the second basis matrix and an activation matrix representing activation levels of respective spectral bases in the third basis matrix to be learned and thereby factorizing the spectrogram into the third basis matrix and the activation matrix representing the activation levels of the respective spectral bases in the third basis matrix, calculates a first activation matrix representing activation levels of respective spectral bases in the first basis matrix, and the signal identification means identifies an acoustic event included in the acoustic signal for identification, based on a combination of activation levels of the spectral bases of the acoustic event in the spectrogram of the acoustic signal for identification, the activation levels being represented by the calculated first activation matrix, using an identification model.

(Supplementary note 3) The signal processing device according to supplementary note 1 or 2 including:

a basis generation means (for example, the basis generation unit 10) for, using as input a spectrogram for basis generation, generating an acoustic event basis group; and a model learning means (for example, the learning data analysis unit 12 and the model learning unit 13) for, upon input of a labeled spectrogram with a label indicating a corresponding acoustic event, using the acoustic event basis group generated by the basis generation means, calculating activation levels of spectral bases of the acoustic event from the labeled spectrogram and learning an identification model.

(Supplementary note 4) The signal processing device according to supplementary note 3 including a prior distribution storage means (for example, the prior distribution storage unit 101 or 501) for storing a prior distribution group that is a set of prior distributions representing representative spectral shapes of the spectral bases of the acoustic event specified as a detection target, wherein the basis generation means, using respective prior distributions included in a prior distribution group as a constraint for spectral bases of a corresponding acoustic event, performs sound source separation on the spectrogram for basis generation and thereby generates an acoustic event basis group.

(Supplementary note 5) The signal processing device according to any one of supplementary notes 1 to 4, wherein the acoustic event basis group is a set of subsets each of which is a group into which two or more spectral bases are grouped with respect to each representative spectral shape of a sound constituting an acoustic event.

(Supplementary note 6) The signal processing device according to supplementary note 3, wherein the acoustic event basis group is a set of subsets each of which is a group into which two or more spectral bases are grouped with respect to each representative spectral shape of a sound constituting an acoustic event, and the model learning means, by, in processing of factorizing the labeled spectrogram with a label indicating a corresponding acoustic event into a first basis matrix representing the acoustic event basis group and a first activation matrix representing activation levels of respective spectral bases in the first basis matrix, factorizing the labeled spectrogram by, with respect to each group, imposing a sparse constraint on an activation group representing a set of activation levels of spectral bases included in the group, the sparse constraint, when updating a value of an activation, causing the value after update to be large if the value before update is large and causing the value after update to be small if the value before update is small, calculates the first activation matrix and learns an identification model, using, as a feature, a combination of activation levels of spectral bases included in the acoustic event basis group in a period of the spectrogram of the acoustic signal for identification, the activation levels being represented by the calculated first activation matrix.

(Supplementary note 7) The signal processing device according to supplementary note 4, wherein the acoustic event basis group is a set of subsets each of which is a group into which two or more spectral bases are grouped with respect to each representative spectral shape of a sound constituting an acoustic event, and the basis generation means, using each prior distribution included in a prior distribution group as a constraint for spectral bases included in a group with respect to a corresponding representative spectral shape and, with respect to each group, using a sparse constraint for an activation group representing a set of activation levels of spectral bases included in the group, the sparse constraint, when updating a value of an activation, causing the value after update to be large if the value before update is large and causing the value after update to be small if the value before update is small, performs sound source separation on the spectrogram for basis generation and thereby generates the acoustic event basis group.

(Supplementary note 8) The signal processing device according to any one of supplementary notes 5 to 7, wherein in each of subsets for each acoustic event included in the acoustic event basis group, two or more spectral bases in which different variations or fluctuations are expressed with respect to a representative spectral shape of a sound constituting the acoustic event are included.

(Supplementary note 9) A signal processing method including:

upon input of a spectrogram of an acoustic signal for identification, performing sound source separation on the spectrogram by using a spectral basis set that is obtained by appending spectral bases corresponding to an unknown acoustic event that is an acoustic event other than an acoustic event specified as a detection target to an acoustic event basis group that is a set of spectral bases of the acoustic event specified as a detection target and causing only unknown spectral bases within the spectral basis set to be learned and thereby calculating activation levels of spectral bases of the acoustic events in the spectrogram of the acoustic signal for identification; and identifying an acoustic event included in the acoustic signal for identification, based on a combination of the calculated activation levels, using an identification model for, using, as a feature, a combination of activation levels of respective spectral bases included in the acoustic event basis group in a period of the spectrogram of the acoustic signal, identifying an acoustic event included in the acoustic signal.

(Supplementary note 10) A computer-readable recording medium storing a signal processing program for causing a computer to execute:

processing of, upon input of a spectrogram of an acoustic signal for identification, performing sound source separation on the spectrogram by using a spectral basis set that is obtained by appending spectral bases corresponding to an unknown acoustic event that is an acoustic event other than an acoustic event specified as a detection target to an acoustic event basis group that is a set of spectral bases of the acoustic event specified as a detection target and causing only unknown spectral bases within the spectral basis set to be learned and thereby calculating activation levels of spectral bases of the acoustic events in the spectrogram of the acoustic signal for identification; and processing of identifying an acoustic event included in the acoustic signal for identification, based on a combination of the calculated activation levels, using an identification model for, using, as a feature, a combination of activation levels of respective spectral bases included in the acoustic event basis group in a period of the spectrogram of the acoustic signal, identifying an acoustic event included in the acoustic signal.

(Supplementary note 11) A signal processing device including:

a prior distribution storage means for storing a prior distribution group that is a set of prior distributions representing representative spectral shapes of spectral bases of an acoustic event specified as a detection target; and a basis generation means for, using as input a spectrogram for basis generation, generating an acoustic event basis group that is a set of the spectral bases of the acoustic event specified as a detection target, wherein the basis generation means, using respective prior distributions included in a prior distribution group as a constraint for spectral bases of a corresponding acoustic event, performs sound source separation on the spectrogram for basis generation and thereby generates an acoustic event basis group.

(Supplementary note 12) The signal processing device according to supplementary note 11, wherein the acoustic event basis group is a set of subsets each of which is a group into which two or more spectral bases are grouped with respect to each representative spectral shape of a sound constituting an acoustic event, and the basis generation means, using each prior distribution included in a prior distribution group as a constraint for spectral bases included in a group with respect to a corresponding representative spectral shape and, with respect to each group, using a sparse constraint for an activation group representing a set of activation levels of spectral bases included in the group, the sparse constraint, when updating a value of an activation, causing the value after update to be large if the value before update is large and causing the value after update to be small if the value before update is small, performs sound source separation on the spectrogram for basis generation and thereby generates the acoustic event basis group.

(Supplementary note 13) The signal processing device according to supplementary note 11, wherein in each of subsets for each acoustic event included in the acoustic event basis group, two or more spectral bases in which different variations or fluctuations are expressed with respect to a representative spectral shape of a sound constituting the acoustic event are included.

(Supplementary note 14) The signal processing device according to any one of supplementary notes 11 to 13, wherein the acoustic event specified as a detection target is a generation of a sound from a specific sound source, and the prior distribution storage means stores a prior distribution group that is a set of prior distributions representing representative spectral shapes of spectral bases of the specific sound source, the signal processing device including:

a distribution analysis means for, using as input a spectrogram of an acoustic signal including only a sound from the specific sound source, generating a prior distribution group;

a sound source separation means for, upon input of a spectrogram of an acoustic signal for sound source separation, performing sound source separation on the spectrogram by, using a first basis matrix representing the acoustic event basis group generated by the basis generation means and using respective prior distributions included in a prior distribution group as a constraint for spectral bases of the corresponding specific sound source, causing the first basis matrix to be learned; and a sound source reconstruction means for, based on the spectral bases of the specific sound source and activation levels of the spectral bases in the spectrogram of the acoustic signal for sound source separation, the spectral bases and the activation levels being obtained as a result of the sound source separation, generating a signal including only a sound from the specific sound source from the acoustic signal for sound source separation.

(Supplementary note 15) The signal processing device according to supplementary note 14, wherein the acoustic event basis group is a set of subsets each of which is a group into which two or more spectral bases are grouped with respect to each representative spectral shape of a sound constituting an acoustic event, the basis generation means, using each prior distribution included in a prior distribution group as a constraint for spectral bases included in a group with respect to a corresponding representative spectral shape and, with respect to each group, using a sparse constraint for an activation group representing a set of activation levels of spectral bases included in the group, the sparse constraint, when updating a value of an activation, causing the value after update to be large if the value before update is large and causing the value after update to be small if the value before update is small, performs sound source separation on the spectrogram for basis generation and thereby generates the acoustic event basis group, and the sound source separation means, in processing of factorizing the spectrogram of the acoustic signal for sound source separation into the first basis matrix representing the acoustic event basis group and a first activation matrix representing activation levels of respective spectral bases in the first basis matrix, factorizes the spectrogram of the acoustic signal for sound source separation by, with respect to each group, imposing a sparse constraint on an activation group representing a set of activation levels of spectral bases included in the group, the sparse constraint, when updating a value of an activation, causing the value after update to be large if the value before update is large and causing the value after update to be small if the value before update is small.

(Supplementary note 16) The signal processing device according to supplementary note 14 or 15, wherein the sound source separation means performs sound source separation on the spectrogram of the acoustic signal for sound source separation by using a spectral basis set that is obtained by appending spectral bases corresponding to a sound other than a sound from the specific sound source to the acoustic event basis group and causing spectral bases in the acoustic event basis group within the spectral basis set to be learned using respective prior distributions included in a prior distribution group as a constraint and causing unknown spectral bases to be learned without constraint.

(Supplementary note 17) A signal processing method including upon input of a spectrogram for basis generation, using respective prior distributions included in a prior distribution group that is a set of prior distributions representing representative spectral shapes of spectral bases of an acoustic event specified as a detection target as a constraint for the spectral bases of the corresponding acoustic event, performing sound source separation on the spectrogram for basis generation and thereby generating an acoustic event basis group that is a set of the spectral bases of the acoustic event specified as a detection target.

(Supplementary note 18) A computer-readable recording medium storing a signal processing program for causing a computer to execute processing of, upon input of a spectrogram for basis generation, using respective prior distributions included in a prior distribution group that is a set of prior distributions representing representative spectral shapes of spectral bases of an acoustic event specified as a detection target as a constraint for the spectral bases of the corresponding acoustic event, performing sound source separation on the spectrogram for basis generation and thereby generating an acoustic event basis group that is a set of the spectral bases of the acoustic event specified as a detection target.

(Supplementary note 19) A signal processing method including:

using as input a spectrogram of an acoustic signal including only a sound from a specific sound source, generating a prior distribution group that is a set of prior distributions representing representative spectral shapes of spectral bases of the specific sound source;

upon input of a spectrogram for basis generation, using respective prior distributions included in the prior distribution group as a constraint for the spectral bases of the corresponding specific sound source, performing sound source separation on the spectrogram for basis generation and thereby generating an acoustic event basis group that is a set of the spectral bases of the specific sound source;

upon input of a spectrogram of an acoustic signal for sound source separation, performing sound source separation on the spectrogram by, using a first basis matrix representing the acoustic event basis group and using the respective prior distributions included in the prior distribution group as a constraint for the spectral bases of the corresponding specific sound source, causing the first basis matrix to be learned and calculating the spectral bases of the specific sound source and activation levels of the spectral bases in the spectrogram of the acoustic signal for sound source separation; and based on the calculated spectral bases of the specific sound source and activation levels of the spectral bases in the spectrogram of the acoustic signal for sound source separation, generating a signal including only a sound from the specific sound source from the acoustic signal for sound source separation.

(Supplementary note 20) A computer-readable recording medium storing a signal processing program for causing a computer to execute:

processing of, using as input a spectrogram of an acoustic signal including only a sound from a specific sound source, generating a prior distribution group that is a set of prior distributions representing representative spectral shapes of spectral bases of the specific sound source;

processing of, upon input of a spectrogram for basis generation, using respective prior distributions included in the prior distribution group as a constraint for the spectral bases of the corresponding specific sound source, performing sound source separation on the spectrogram for basis generation and thereby generating an acoustic event basis group that is a set of the spectral bases of the specific sound source;

processing of, upon input of a spectrogram of an acoustic signal for sound source separation, performing sound source separation on the spectrogram by, using a first basis matrix representing the acoustic event basis group and using the respective prior distributions included in the prior distribution group as a constraint for the spectral bases of the corresponding specific sound source, causing the first basis matrix to be learned and calculating spectral bases of the specific sound source and activation levels of the spectral bases in the spectrogram of the acoustic signal for sound source separation; and processing of, based on the calculated spectral bases of the specific sound source and activation levels of the spectral bases in the spectrogram of the acoustic signal for sound source separation, generating a signal including only a sound from the specific sound source from the acoustic signal for sound source separation.

The present disclosure was described above through example embodiments thereof, but the present disclosure is not limited to the above example embodiments. Various modifications that could be understood by a person skilled in the art may be applied to the configurations and details of the present disclosure within the scope of the present disclosure.

This application claims priority based on Japanese Patent Application No. 2016-120127, filed on Jun. 16, 2016, the entire disclosure of which is incorporated herein by reference.

INDUSTRIAL APPLICABILITY

The present disclosure is suitably applicable to use in detecting an occurrence of a predetermined physical event accompanied by a generation of a sound and use in separating a sound from a predetermined sound source from sound source signals collected under an unknown environment.

REFERENCE SIGNS LIST 100, 110, 200, 400, 500, 600 Signal processing device
10, 40, 50 Basis generation unit
101, 501 Prior distribution storage unit
102, 502 Basis signal analysis unit
103, 503 Distribution analysis unit
11, 51 Acoustic event identification unit
111, 511 Basis storage unit
112, 512 Identification signal analysis unit
113, 513 Model storage unit
114, 514 Signal identification unit
12, 52 Learning data analysis unit
13, 53 Model learning unit
61 Distribution analysis unit
62 Prior distribution storage unit
63 Sound source separation unit
64 Sound source reconstruction unit

What is claimed is:
1. A signal processing device comprising:
a prior distribution storage that stores a prior distribution group that is a set of prior distributions representing representative spectral shapes of spectral bases of an acoustic event specified as a detection target;
a memory storing instructions; and
one or more processors configured to execute the instructions to:
generate, using as input a spectrogram for basis generation, an acoustic event basis group that is a set of the spectral bases of the acoustic event specified as a detection target, wherein
the one or more processors perform sound source separation on the spectrogram for basis generation and thereby generates an acoustic event basis group, using respective prior distributions included in a prior distribution group as a constraint for spectral bases of a corresponding acoustic event, wherein
the acoustic event specified as a detection target is a generation of a sound from a specific sound source, and
the prior distribution storage stores a prior distribution group that is a set of prior distributions representing representative spectral shapes of spectral bases of the specific sound source,
wherein the one or more processors further execute the instructions to:
generate, using as input a spectrogram of an acoustic signal including only a sound from the specific sound source, a prior distribution group;
perform, upon input of a spectrogram of an acoustic signal for sound source separation, sound source separation on the spectrogram by, using a first basis matrix representing the acoustic event basis group that has been generated and using respective prior distributions included in a prior distribution group as a constraint for spectral bases of the corresponding specific sound source, causing the first basis matrix to be learned; and
generate, based on the spectral bases of the specific sound source and activation levels of the spectral bases in the spectrogram of the acoustic signal for sound source separation, the spectral bases and the activation levels being obtained as a result of the sound source separation, a signal including only a sound from the specific sound source from the acoustic signal for sound source separation.

2. The signal processing device according to claim 1, wherein
the acoustic event basis group is a set of subsets each of which is a group into which two or more spectral bases are grouped with respect to each representative spectral shape of a sound constituting an acoustic event, and
the one or more processors, using each prior distribution included in a prior distribution group as a constraint for spectral bases included in a group with respect to a corresponding representative spectral shape and, with respect to each group, using a sparse constraint for an activation group representing a set of activation levels of spectral bases included in the group, the sparse constraint, when updating a value of an activation, causing a value of the activation for a first spectral base among the spectral bases after update to be larger than a value of the activation for the first spectral base before update if the value of the activation for the first spectral base before update is larger than a value of the activation for a second spectral base among the spectral bases before update and causing a value of the activation for the first spectral base after update to be smaller than a value of the activation for the first spectral base before update if the value of the activation for the first spectral base before update is smaller than a value of the activation for the second spectral base before update, perform sound source separation on the spectrogram for basis generation and thereby generate the acoustic event basis group.

3. The signal processing device according to claim 1, wherein
in each of subsets for each acoustic event included in the acoustic event basis group, two or more spectral bases in which different variations or fluctuations are expressed with respect to a representative spectral shape of a sound constituting the acoustic event are included.

4. The signal processing device according to claim 1, wherein
the acoustic event basis group is a set of subsets each of which is a group into which two or more spectral bases are grouped with respect to each representative spectral shape of a sound constituting an acoustic event,
the one or more processors, using each prior distribution included in a prior distribution group as a constraint for spectral bases included in a group with respect to a corresponding representative spectral shape and, with respect to each group, using a sparse constraint for an activation group representing a set of activation levels of spectral bases included in the group, the sparse constraint, when updating a value of an activation, causing a value of the activation for a first spectral base among the spectral bases after update to be larger than a value of the activation for the first spectral base before update if the value of the activation for the first spectral base before update is larger than a value of the activation for a second spectral base among the spectral bases before update and causing a value of the activation for the first spectral base after update to be smaller than a value of the activation for the first spectral base before update if the value of the activation for the first spectral base before update is smaller than a value of the activation for the second spectral base before update, perform sound source separation on the spectrogram for basis generation and thereby generates the acoustic event basis group, and
the one or more processors, in processing of factorizing the spectrogram of the acoustic signal for sound source separation into the first basis matrix representing the acoustic event basis group and a first activation matrix representing activation levels of respective spectral bases in the first basis matrix, factorize the spectrogram of the acoustic signal for sound source separation by, with respect to each group, imposing a sparse constraint on an activation group representing a set of activation levels of spectral bases included in the group, the sparse constraint, when updating a value of an activation, causing a value of the activation for a first spectral base among the spectral bases after update to be larger than a value of the activation for the first spectral base before update if the value of the activation for the first spectral base before update is larger than a value of the activation for a second spectral base among the spectral bases before update and causing a value of the activation for the first spectral base after update to be smaller than a value of the activation for the first spectral base before update if the value of the activation for the first spectral base before update is smaller than a value of the activation for the second spectral base before update.

5. The signal processing device according to claim 1, wherein
the one or more processors perform sound source separation on the spectrogram of the acoustic signal for sound source separation by using a spectral basis set that is obtained by appending spectral bases corresponding to a sound other than a sound from the specific sound source to the acoustic event basis group and causing spectral bases in the acoustic event basis group within the spectral basis set to be learned using respective prior distributions included in a prior distribution group as a constraint and causing the spectral bases corresponding to a sound other than a sound from the specific sound source to be learned without constraint.

6. A signal processing method comprising
upon input of a spectrogram for basis generation, using respective prior distributions included in a prior distribution group that is a set of prior distributions representing representative spectral shapes of spectral bases of an acoustic event specified as a detection target as a constraint for the spectral bases of the corresponding acoustic event, performing sound source separation on the spectrogram for basis generation and thereby generating an acoustic event basis group that is a set of the spectral bases of the acoustic event specified as a detection target, wherein the acoustic event is specified as a detection target is a generation of a sound from a specific sound source;
generating, using as input a spectrogram of an acoustic signal including only a sound from the specific sound source, a prior distribution group that is a set of prior distributions representing representative spectral shapes of spectral bases of the specific sound source;
performing, upon input of a spectrogram of an acoustic signal for sound source separation, sound source separation on the spectrogram by, using a first basis matrix representing the acoustic event basis group that has been generated and using respective prior distributions included in a prior distribution group as a constraint for spectral bases of the corresponding specific sound source, causing the first basis matrix to be learned; and
generating, based on the spectral bases of the specific sound source and activation levels of the spectral bases in the spectrogram of the acoustic signal for sound source separation, the spectral bases and the activation levels being obtained as a result of the sound source separation, a signal including only a sound from the specific sound source from the acoustic signal for sound source separation.

7. A non-transitory computer-readable recording medium storing a signal processing program for causing a computer to execute
processing of, upon input of a spectrogram for basis generation, using respective prior distributions included in a prior distribution group that is a set of prior distributions representing representative spectral shapes of spectral bases of an acoustic event specified as a detection target as a constraint for the spectral bases of the corresponding acoustic event, performing sound source separation on the spectrogram for basis generation and thereby generating an acoustic event basis group that is a set of the spectral bases of the acoustic event specified as a detection target, wherein the acoustic event is specified as a detection target is a generation of a sound from a specific sound source;
generating, using as input a spectrogram of an acoustic signal including only a sound from the specific sound source, a prior distribution group that is a set of prior distributions representing representative spectral shapes of spectral bases of the specific sound source;
performing, upon input of a spectrogram of an acoustic signal for sound source separation, sound source separation on the spectrogram by, using a first basis matrix representing the acoustic event basis group that has been generated and using respective prior distributions included in a prior distribution group as a constraint for spectral bases of the corresponding specific sound source, causing the first basis matrix to be learned; and generating, based on the spectral bases of the specific sound source and activation levels of the spectral bases in the spectrogram of the acoustic signal for sound source separation, the spectral bases and the activation levels being obtained as a result of the sound source separation, a signal including only a sound from the specific sound source from the acoustic signal for sound source separation.

\* \* \* \* \*